United States Patent
Babin

(10) Patent No.: US 7,182,591 B2
(45) Date of Patent: Feb. 27, 2007

(54) INJECTION NOZZLE SYSTEM AND INJECTION MOLDING MACHINE INCORPORATING SAME

(75) Inventor: Denis Babin, Georgetown (CA)

(73) Assignee: Mold-Masters Limited, Georgetown (CA)

( * ) Notice: Subject to any disclaimer, the term of this patent is extended or adjusted under 35 U.S.C. 154(b) by 0 days.

(21) Appl. No.: 10/880,438

(22) Filed: Jun. 30, 2004

(65) Prior Publication Data

US 2005/0136151 A1 Jun. 23, 2005

Related U.S. Application Data

(63) Continuation of application No. 10/268,886, filed on Oct. 11, 2002, now Pat. No. 6,769,901, which is a continuation of application No. PCT/CA01/00527, filed on Apr. 12, 2001.

(51) Int. Cl.
*B29C 45/20* (2006.01)
(52) U.S. Cl. ............... 425/568; 425/567; 425/549; 425/564; 425/565; 425/566; 264/328.15
(58) Field of Classification Search ............... 425/549, 425/564, 565, 566, 567, 568; 264/328.15
See application file for complete search history.

(56) References Cited

U.S. PATENT DOCUMENTS

| 2,865,050 | A | 12/1958 | Strauss |
| 3,488,810 | A | 1/1970 | Gellert |
| 3,677,682 | A | 7/1972 | Putkowski |
| 3,716,318 | A | 2/1973 | Erik et al. |
| 3,741,704 | A | 6/1973 | Beasley |
| 3,952,927 | A | 4/1976 | Schaumburg et al. |
| 4,004,871 | A | 1/1977 | Hardy |

(Continued)

FOREIGN PATENT DOCUMENTS

CA 2082700 5/1994

(Continued)

OTHER PUBLICATIONS

Daniel Frenkler and Henry K. Zawistowski—RAPRA Technology Ltd., "Hot Runners in Injection Moulds" (2001).

(Continued)

*Primary Examiner*—Joseph S. Del Sole
*Assistant Examiner*—Maria Veronica Ewald
(74) *Attorney, Agent, or Firm*—McDonnell Boehnen Hulbert & Berghoff LLP

(57) ABSTRACT

A nozzle system is provided for an injection molding machine. The nozzle system includes a nozzle tip that is removably connected to a nozzle body with a sealing and mounting sleeve element. The nozzle body includes a first connector for releasably connecting with a second connector defined on the sleeve. The sleeve element further includes an alignment bearing for engaging a bearing surface defined on the nozzle body for precisely locating the nozzle tip within the nozzle body along on a predetermined axis. Further embodiments of the invention provide a valve pin disposed in the nozzle body and nozzle tip. The valve pin includes a bearing surface for engaging a guiding surface defined on the second melt channel for aligning the end of the valve pin with a mold gate. Further embodiments also provide an integrally connected nozzle tip and sleeve element.

24 Claims, 36 Drawing Sheets

U.S. PATENT DOCUMENTS

| | | | |
|---|---|---|---|
| 4,010,903 A | 3/1977 | Sakuri et al. | |
| 4,013,393 A | 3/1977 | Gellert | |
| 4,043,740 A | 8/1977 | Gellert | |
| 4,053,271 A | 10/1977 | Gellert | |
| 4,173,448 A | 11/1979 | Rees et al. | |
| 4,212,627 A | 7/1980 | Gellert | |
| 4,268,240 A | 5/1981 | Rees et al. | |
| 4,268,241 A | 5/1981 | Rees et al. | |
| 4,279,588 A * | 7/1981 | Gellert | 425/568 |
| 4,286,941 A | 9/1981 | Gellert | |
| 4,306,852 A | 12/1981 | Mateev et al. | |
| 4,312,630 A | 1/1982 | Travaglini | |
| 4,318,686 A * | 3/1982 | Morgan | 425/543 |
| 4,330,258 A | 5/1982 | Gellert | |
| 4,368,028 A | 1/1983 | Grish et al. | |
| 4,412,807 A | 11/1983 | York | |
| 4,450,999 A | 5/1984 | Gellert | |
| 4,517,453 A | 5/1985 | Tsutsumi | |
| 4,652,230 A | 3/1987 | Osuna-Diaz | |
| 4,662,837 A | 5/1987 | Anderson | |
| 4,663,811 A * | 5/1987 | Gellert | 29/890.142 |
| 4,768,283 A | 9/1988 | Gellert | |
| 4,768,945 A | 9/1988 | Schmidt et al. | |
| 4,771,164 A | 9/1988 | Gellert | |
| 4,781,572 A | 11/1988 | Boring | |
| 4,787,836 A | 11/1988 | Osuna-Diaz et al. | |
| 4,832,593 A | 5/1989 | Brown | |
| 4,875,848 A | 10/1989 | Gellert | |
| 4,902,218 A | 2/1990 | Leonard et al. | |
| 4,911,636 A | 3/1990 | Gellert | |
| 4,925,384 A | 5/1990 | Manner | |
| 4,945,630 A | 8/1990 | Gellert | |
| 4,950,154 A | 8/1990 | Moberg | |
| 4,954,072 A | 9/1990 | Zimmerman | |
| 4,981,431 A | 1/1991 | Schmidt | |
| 5,015,170 A | 5/1991 | Gellert | |
| 5,028,227 A | 7/1991 | Gellert et al. | |
| 5,030,084 A | 7/1991 | Gellert et al. | |
| 5,053,271 A | 10/1991 | Mori et al. | |
| 5,067,893 A | 11/1991 | Osuna-Diaz | |
| 5,135,377 A * | 8/1992 | Gellert | 425/130 |
| 5,139,724 A | 8/1992 | Hofstetter et al. | |
| 5,141,696 A | 8/1992 | Osuna-Diaz | |
| 5,208,052 A | 5/1993 | Schmidt et al. | |
| 5,208,228 A | 5/1993 | Ok et al. | |
| 5,238,378 A | 8/1993 | Gellert | |
| 5,254,305 A | 10/1993 | Fernandez et al. | |
| 5,268,184 A | 12/1993 | Gellert | |
| 5,269,677 A | 12/1993 | Gauler | |
| 5,299,928 A * | 4/1994 | Gellert | 425/190 |
| 5,324,191 A | 6/1994 | Schmidt | |
| 5,334,008 A | 8/1994 | Gellert | |
| 5,360,333 A | 11/1994 | Schmidt | |
| 5,374,182 A | 12/1994 | Gessner | |
| 5,421,716 A | 6/1995 | Gellert | |
| 5,443,381 A | 8/1995 | Gellert | |
| 5,474,439 A | 12/1995 | McGrevy | |
| 5,492,467 A | 2/1996 | Hume et al. | |
| 5,501,594 A | 3/1996 | Glozer et al. | |
| 5,505,613 A | 4/1996 | Krummenacher | |
| 5,518,393 A | 5/1996 | Gessner | |
| 5,545,028 A | 8/1996 | Hume et al. | |
| 5,554,395 A | 9/1996 | Hume et al. | |
| 5,569,475 A | 10/1996 | Adas et al. | |
| 5,652,003 A | 7/1997 | Gellert | |
| 5,658,604 A | 8/1997 | Gellert et al. | |
| 5,674,439 A | 10/1997 | Hume et al. | |
| 5,686,122 A | 11/1997 | Huntington et al. | |
| 5,695,793 A | 12/1997 | Bauer | |
| 5,700,499 A | 12/1997 | Bauer | |
| 5,707,667 A | 1/1998 | Galt et al. | |
| 5,736,171 A | 4/1998 | McGrevy | |
| 5,795,599 A | 8/1998 | Gellert | |
| 5,804,228 A | 9/1998 | Kofsman et al. | |
| 5,811,140 A | 9/1998 | Manner | |
| 5,820,899 A | 10/1998 | Gellert et al. | |
| 5,834,041 A | 11/1998 | Sekine et al. | |
| 5,845,853 A | 12/1998 | Frideman | |
| 5,849,343 A | 12/1998 | Gellert et al. | |
| 5,871,785 A | 2/1999 | Van Boekel | |
| 5,871,786 A | 2/1999 | Hume et al. | |
| 5,879,727 A | 3/1999 | Puri | |
| 5,885,628 A | 3/1999 | Swenson et al. | |
| 5,894,025 A | 4/1999 | Lee et al. | |
| 5,895,669 A | 4/1999 | Seres, Jr. et al. | |
| 5,925,386 A | 7/1999 | Moberg | |
| 5,941,637 A | 8/1999 | Maurer | |
| 5,948,450 A | 9/1999 | Swenson et al. | |
| 5,955,121 A | 9/1999 | Gellert et al. | |
| 5,980,234 A | 11/1999 | Harley | |
| 5,980,237 A | 11/1999 | Swenson et al. | |
| 5,984,661 A | 11/1999 | Vorkoper | |
| 6,003,182 A | 12/1999 | Song | |
| 6,009,616 A | 1/2000 | Gellert | |
| 6,017,209 A | 1/2000 | Gellert et al. | |
| 6,022,210 A | 2/2000 | Gunther | |
| 6,030,202 A | 2/2000 | Gellert et al. | |
| 6,036,467 A | 3/2000 | Jameson | |
| 6,050,806 A | 4/2000 | Ko | |
| 6,074,195 A | 6/2000 | Belous | |
| 6,089,468 A | 7/2000 | Bouti | |
| 6,113,381 A | 9/2000 | Gellert et al. | |
| 6,135,757 A | 10/2000 | Jenko | |
| 6,143,358 A | 11/2000 | Singh et al. | |
| 6,164,954 A * | 12/2000 | Mortazavi et al. | 425/549 |
| 6,220,851 B1 | 4/2001 | Jenko | |
| 6,227,461 B1 | 5/2001 | Schroeder et al. | |
| 6,234,783 B1 | 5/2001 | Shibata et al. | |
| 6,245,278 B1 | 6/2001 | Lausenhammer et al. | |
| 6,254,377 B1 | 7/2001 | Kazmer et al. | |
| 6,261,084 B1 | 7/2001 | Schmidt | |
| 6,264,460 B1 | 7/2001 | Wright et al. | |
| 6,273,706 B1 | 8/2001 | Gunther | |
| 6,287,107 B1 | 9/2001 | Kazmer et al. | |
| 6,309,208 B1 | 10/2001 | Kazmer et al. | |
| 6,315,549 B1 | 11/2001 | Jenko et al. | |
| 6,318,990 B1 | 11/2001 | Gellert et al. | |
| 6,331,106 B1 | 12/2001 | Helldin | |
| 6,358,038 B1 | 3/2002 | Rozenberg | |
| 6,358,039 B1 | 3/2002 | Manner et al. | |
| 6,394,785 B1 | 5/2002 | Ciccone | |
| 6,419,116 B1 | 7/2002 | Eigler et al. | |
| 6,428,305 B2 | 8/2002 | Jenko | |
| 6,533,571 B2 | 3/2003 | Fikani | |
| 6,609,902 B1 | 8/2003 | Blais et al. | |
| 6,709,262 B2 | 3/2004 | Fong | |
| 6,726,467 B1 | 4/2004 | Lefebure | |
| 6,769,901 B2 | 8/2004 | Babin et al. | |
| 6,789,745 B1 | 9/2004 | Babin et al. | |
| 6,821,112 B2 | 11/2004 | Eigler et al. | |
| 6,832,909 B2 | 12/2004 | Bazzo et al. | |
| 6,869,276 B2 | 3/2005 | Babin et al. | |
| 6,921,257 B2 | 7/2005 | Olaru | |
| 6,921,259 B2 | 7/2005 | Gellert | |
| 6,962,492 B2 | 11/2005 | Olaru | |
| 6,971,869 B2 | 12/2005 | Olaru | |
| 6,988,883 B2 | 1/2006 | Babin et al. | |
| 2003/0008034 A1 | 1/2003 | Niewels | |
| 2003/0235638 A1 | 12/2003 | Gellert | |
| 2004/0058031 A1 | 3/2004 | Niewels | |
| 2004/0071817 A1 | 4/2004 | Fischer et al. | |
| 2004/0131721 A1 | 7/2004 | Babin et al. | |
| 2004/0137107 A1 | 7/2004 | Babin et al. | |
| 2004/0146598 A1 | 7/2004 | Sicilia et al. | |

| | | | |
|---|---|---|---|
| 2004/0208949 A1 | 10/2004 | Niewels | |
| 2004/0258788 A1 | 12/2004 | Olaru | |
| 2005/0003039 A1 | 1/2005 | Babin et al. | |
| 2005/0106283 A1 | 5/2005 | Olaru | |
| 2005/0118298 A1 | 6/2005 | Babin et al. | |
| 2005/0136151 A1 | 6/2005 | Babin | |
| 2005/0214403 A1 | 9/2005 | Olaru | |

FOREIGN PATENT DOCUMENTS

| | | | |
|---|---|---|---|
| CA | 2190569 | | 5/1998 |
| CA | 2261367 | | 8/2000 |
| CA | 2358148 | | 3/2003 |
| CA | 2473920 | A1 | 8/2003 |
| DE | 32 45 571 | A1 | 6/1984 |
| DE | 296 02 484 | U | 5/1996 |
| DE | 196 08 676 | C1 | 1/1997 |
| DE | 100 08 722 | A1 | 8/2001 |
| DE | 100 37 739 | A1 | 2/2002 |
| EP | 0 590 677 | A1 | 4/1994 |
| EP | 0 638 407 | A1 | 2/1995 |
| EP | 0 743 158 | A1 | 11/1996 |
| EP | 0 750 975 | A1 | 1/1997 |
| EP | 0 835 176 | B1 | 4/1998 |
| EP | 0 873 841 | A2 | 10/1998 |
| EP | 0 920 969 | A1 | 6/1999 |
| EP | 0 743 158 | B1 | 8/1999 |
| EP | 0 962 296 | A2 | 12/2001 |
| EP | 1 188 537 | A2 | 3/2002 |
| EP | 1 321 274 | A1 | 6/2003 |
| FR | 2 537 497 | A1 | 6/1984 |
| GB | 1 540 698 | | 2/1979 |
| JP | 5-261770 | A | 10/1992 |
| JP | 5-177664 | A | 7/1993 |
| JP | 5-309695 | A | 11/1993 |
| JP | 6 143358 | | 5/1994 |
| JP | 7-148786 | A | 6/1995 |
| JP | 8-90598 | A | 4/1996 |
| JP | 9-123222 | A | 5/1997 |
| JP | 10 34708 | | 2/1998 |
| JP | 10-264222 | A | 10/1998 |
| JP | 10-296798 | A | 11/1998 |
| JP | 11-254488 | A | 9/1999 |
| JP | 2002-071873 | A | 3/2002 |
| JP | 2002-273768 | A | 9/2002 |
| JP | 2002-307492 | A | 10/2002 |
| WO | WO 84/00922 | A1 | 3/1984 |
| WO | WO 97/02129 | | 1/1997 |
| WO | WO 00/48814 | | 8/2000 |
| WO | WO 01/28750 | A1 | 4/2001 |
| WO | WO 01/78961 | A1 | 10/2001 |
| WO | WO 02/40245 | A1 | 5/2002 |
| WO | WO 03/004243 | A1 | 1/2003 |
| WO | WO 03/028973 | A1 | 4/2003 |
| WO | WO 03/028974 | A1 | 4/2003 |
| WO | WO 03/070446 | A1 | 8/2003 |
| WO | WO 03/086734 | A1 | 10/2003 |
| WO | WO 2004/012923 | A2 | 2/2004 |
| WO | WO 2005/090051 | A1 | 9/2005 |

OTHER PUBLICATIONS

Ewikon Product Catalog entitled "AuBenbeheizte HeiBkanalduse, 230 V, fur schnelle Farbwechsel," 3 pgs. (Oct. 2000).
Ewikon, Hotrunner Systems for Large Parts, pp. 2-11 (2000).
Ewikon, Hotrunner Systems for the Packaging and Medical Industry, pp. 2-7 (2001).
Ewikon, HPS III Single Tips, 230 V Externally Heated, "HPS III-SE High Preformance Single Tips, 230 V With Tip Sealing Technology," pp. 2-9 (2002).
Ewikon, HPS III-VT Nozzles, 230 V Eternally Heated, "For Multi-Cavity Applications and Close Cavity Spacing," pp. 2-7 (2001).
Ewikon, HPS III-NV Valve Gate Systems, "All Advantages of the Valve Gate Technology in a Most Compact System," p. 209 (2001).
Ewikon, Instruction Manual for Ewikon Hotrunner Systems, date unknown.
Ewikon, Product Guide, "Internally Heated Hotrunner Systems," pp. 2-7 (2000).
H.P. Manner, "NadelverschluBdusen fur kurze Zykluszeit," Kunststoffe 85(2):166-168 (1995).
Hydraulic Injection Molding Machinery, Cincinnati Milacron pamphlet (1984).
Husky Injection Molding Systems, S.A., 750 Series.
Redacted letter and attached figure addressed to Mold Masters Limited from the representative of Mr. Maurizio Bazzo dated Dec. 21, 2001.
.J.D. Robinson, "Gating and Cooling Techniques for Polypropylene," Plastics, pp. 47-51 (Aug. 1965).
Kona Corporation Catalog entitled "Kona Bushing for Sprueless Molding," pp. 1-24 (Jun. 25, 2001).
"Mold Hotrunner Solutions" Product illustration of a Guided Mechanism, date unknown.
PCT Search Report for PCT/CA03/01154 dated Dec. 3, 2004.
PCT Search Report for WO 03/70446 (Application No. PCT/CA03/00244), dated May 16, 2003.
Press Release entitled "Mold-Masters Introduces The New Accu-Gate Virtually Eliminating Gate Wear" (Dec. 12, 2002).
Redacted Images and information from "Gunther Hot Runner Technology," taken from Gunther website (Aug. 2003).

* cited by examiner

INJECTION NOZZLE SYSTEM AND INJECTION MOLDING MACHINE INCORPORATING SAME

This application is a continuation of U.S. Ser. No. 10/268,886, filed Oct. 11,2002 (now U.S. Pat. No. 6,769,901 that issued Aug. 3,2004), which is a continuation of PCT application No. PCT/CA01/00527, filed Apr. 12, 2001, which are both incorporated by reference herein in their entireties.

BACKGROUND OF THE INVENTION

1. Field of the Invention

This invention relates generally to injection molding and more particularly to injection nozzle systems for injection molding machines.

2. Related Art

Injection nozzle systems with nozzle seals and gate inserts for insertion in the front end of a heated nozzle are well known and have various configurations. U.S. Pat. No. 4,043,740 to Gellert shows a nozzle seal which fits into a matching seat in the front end of the nozzle and has a portion which tapers inwardly around the gate. U.S. Pat. No. 4,981,431 to Schmidt discloses a nozzle seal having an outer sealing flange which is screwed into place in a seat in the front end of the heated nozzle. U.S. Pat. No. 4,875,848 to Gellert describes a gate insert which screws into place and has an integral electrical heating element. U.S. Pat. No. 5,028,227 to Gellert et al. shows a gate insert having a circumferential removal flange to permit it to be pried from the nozzle seat when removal is desired.

These nozzle systems, however, are unsatisfactory when molding materials having a narrow temperature window because heat transfer is slow along the nozzle seal and heat is lost to the surrounding cooled mold. To combat this problem, U.S. Pat. No. 5,299,928 to Gellert discloses the use of a two-piece nozzle insert, wherein an outer sealing piece is made of a material having relatively low thermal conductivity, such as titanium, and wherein an inner tip piece is made of a material having a relatively high thermal conductivity, such as beryllium copper, or a wear resistant material like tungsten carbide. This results in good heat transfer in the interior portion of the part, with an insulative effect being created by the exterior less conductive portion. However, because the inner tip piece must be made of a material such as beryllium copper or tungsten carbide, it cannot be easily and reliably threaded for attachment to the outer sealing piece of the two-piece seal. Consequently the inner tip portion is trapped in place between the seal and nozzle to hold the inner piece in place while the seal is installed in the nozzle. Typically, as shown in Gellert U.S. Pat. No. 5,299,928, this is achieved by providing the inner piece with an outwardly extending shoulder against which the outer piece can bear to securely retain the inner piece between the outer piece and the nozzle when the outer piece is threaded onto the nozzle.

A problem with conventional nozzle systems is that misalignment of the nozzle can occur due to wear or other imperfections in the threaded connection between the nozzle tip connection element and the nozzle body. It is important for the tip of injection nozzles to be aligned precisely within the gate to insure an even and unimpeded flow of melt to the melt cavities.

A problem with valve gated injection nozzles is that the valve pin that is located within the melt channel tends to become misaligned with the mold gate due to the extreme pressures exerted on the valve pin by the melt. As a result, the end of the valve pin becomes damaged over numerous cycles as it continuously engages the wall of the mold gate. The damage to the end of the pin results in imperfections in the molded parts.

Other problems associated with the molding of precision parts using valve gated injection nozzles include restricted backflow between the end of the valve pin and the mold gate, inadequate transfer of heat from the heated nozzle to the melt and inadequate change over times in cases where maintenance or color changes are required. All of the problems can contribute to flaws in the molded parts and delays in production.

Attempts have been made in the past to address these problems with valve gated injection nozzles. U.S. Pat. No. 4,412,807 (York), U.S. Pat. No. 5,254,305 (Fernandes), and U.S. Pat. No. 5,700,499 (Bauer) disclose various arrangements of guide surfaces defined on a valve pin and a melt channel to align the end of the valve pin within a mold gate. These devices do not adequately address backflow and thermal conductivity problems as discussed above, nor do they address the need for quick change over times to conduct maintenance or color changes. U.S. Pat. No. 3,716,318 (Erik) and U.S. Pat. No. 5,849,343 (Gellert), German Patent DE3245571 (Manner) and European Patent 638407 (Krummenacher) disclose various arrangements of guide elements having apertures for conducting the melt. A problem associated with these devices is the formation of flow lines in the molded parts due to the splitting of melt in the melt channel. The devices also suffer from the thermal conductivity and change over problems as noted with the patents described above. U.S. Pat. No. 2,865,050 (Strauss) discloses a valve gated injection nozzle for a cold runner system. The valve pin includes flattened surfaces to encourage backflow during closing of the valve pin. Strauss is not suitable for hot runner applications where freezing of the melt in the melt channel is unacceptable. Strauss of course also does not address thermal conductivity problems and also does not permit rapid change overs.

Another problem with two piece nozzle designs is that heated melt often seeps in and around the junction of the nozzle and the inner piece of the removable nozzle seal. When cooled, this resin seepage acts like a glue to stick in the nozzle seal in the nozzle end. When the connector is unthreaded in single piece devices, the "glue" is broken. However, because the inner and outer pieces of the nozzle seal are unattached in two-piece nozzles seals like that of the Gellert '928, when the outer piece is unscrewed and removed from the nozzle, the inner piece remains stuck within the nozzle. The inner piece must then be dislodged from the nozzle by other means, such as by hitting or prying the inner piece to unstick it from its seat in the nozzle end. Invariably, whatever the technique for dislodging, additional wear and/or even outright damage to the inner piece results, shortening the life of the piece.

Other multi-piece designs are also known. U.S. Pat. No. 5,545,028 to Hume, U.S. Pat. No. 5,658,604 to Gellert and U.S. Pat. No. 6,089,468 to Bouti show various alternatives or improvements to the design of Gellert '928, but these also suffer from the same drawback, namely that devices are still susceptible to having the tip remain stuck in the nozzle end when the seal is unscrewed and removed from the nozzle for maintenance, etc.

Also similar to the Gellert '928 configuration is the removable nozzle tip and seal insert disclosed in U.S. Pat. No. 5,208,052 to Schmidt. Here a beryllium copper tip is held in place between the nozzle and a titanium seal which is threaded to the nozzle. An insulative air space is further provided between the tip and the sleeve. A zero clearance fit exists between the tip and the sleeve in the cold condition so that, when the nozzle reaches operating temperature, the tip longitudinal growth caused by thermal expansion forces the sleeve outward and downward against the mold. While apparently providing an improved means for sealing the mold gate, the insert of Schmidt also is susceptible to remaining stuck in the nozzle end. Thus, tip damage of the type already described may still result. A further disadvantage of the Schmidt design is that the nozzle tip and sleeve require extremely accurate machining to within tight tolerances to ensure that the zero clearance sealing mechanism of the invention is effective. Such accurate machining is time-consuming and expensive.

Another removable tip and gate configuration is provided by U.S. Pat. No. 5,879,727 to Puri. Puri discloses providing an intermediate titanium or ceramic insulating element between a copper-alloy nozzle tip and a steel gate insert to thermally isolate the nozzle tip from the gate insert while permit a secure mechanically connection between the two. The tip itself joins the assembly to the nozzle end, either removably, through the provision of threads, or integrally. As described above, however, the threading of the nozzle tip is undesirable where copper-alloy tips are used and impossible if a tungsten carbide tip insert is desired. Furthermore, the additional insulating sleeve of Puri is an additional element which must be accurately machined and maintained, thereby adding to both the initial cost and the maintenance demands on the operator.

U.S. Pat. No. 4,004,871 to Hardy discloses a bi-material mold gate conduit for use in injection molding thermosetting resins. The Mold gate conduit has an inner tube welded or brazed to an outer sleeve-like body. The outer sleeve is slidably received within and pinned between co-operating mold plate members, and an annular chamber for circulating coolant around the gate is provided between the outer sleeve and the inner tube. However, because the outer sleeve is only slidably received by the assembly, there is no secure attachment provided and, further, removal can be difficult because resin leakage can freeze the conduit to the assembly, making the unit just as susceptible to damage in removal as in those devices described above.

There is a need for improved nozzle systems that overcome the above identified problems.

SUMMARY OF THE INVENTION

In one aspect, the invention provides nozzle system for a injection molding machine, said system comprising: a nozzle body defining a first portion of a melt channel, said nozzle body defining a bore and a first connector; a nozzle tip defining a second portion of said melt channel, said nozzle tip being sized to fit within said bore of said nozzle body; a sealing and mounting element for mounting said nozzle tip to said nozzle body with said first portion and said second portion of said melt channel being fluidly connected, said element defining a second connector for removably connecting with said first connector defined on said nozzle body and an alignment bearing for engaging a bearing surface defined on said nozzle body for precisely aligning said nozzle tip within said nozzle body along a predetermined axis.

In another aspect the invention provides an injection molding machine comprising: a stationary platen and at least one movable platen; a manifold disposed in said stationary platen, said manifold defining a manifold melt channel for conducting melt from a melt source; an injection system having an injection nozzle, a mold cavity and a gating device, said injection nozzle defining a nozzle melt channel fluidly connected to said manifold melt channel, said mold cavity being in fluid communication with said nozzle melt channel and said gating device being operatively connected to said injection nozzle for controllably gating the flow of melt from said nozzle melt channel to said mold cavity; said injection nozzle including: a nozzle body defining a first portion of a melt channel, said nozzle body defining a bore and a first connector; a nozzle tip defining a second portion of said melt channel, said nozzle tip being sized to fit within said bore of said nozzle body; and a sealing and mounting element for mounting said nozzle tip to said nozzle body with said first portion and said second portion of said melt channel being fluidly connected, said element defining a second connector for removably connecting with said first connector defined on said nozzle body and an alignment bearing for engaging a bearing surface defined on said nozzle body for precisely aligning said nozzle tip within said nozzle body along a predetermined axis.

BRIEF DESCRIPTION OF THE DRAWINGS

For a better understanding of the present invention, and to show more clearly how it may be carried into effect, reference will now be made by way of example to the accompanying drawings. The drawings show preferred embodiments of the present invention, in which:

FIG. 30b is an enlarged sectional view of a second configuration of the embodiment of FIG. 30a;

FIG. 31a is an enlarged sectional view of yet another alternate embodiment of the nozzle tip of FIG. 24, having an internal angled portion at an upper end thereof;

FIG. 31b is a much enlarged sectional view of a portion of FIG. 31a;

FIGS. 36a–36d are enlarged sectional views of alternate embodiments of the nozzle tip of FIG. 35;

DETAILED DESCRIPTION OF THE PREFERRED EMBODIMENT

Figure 1:
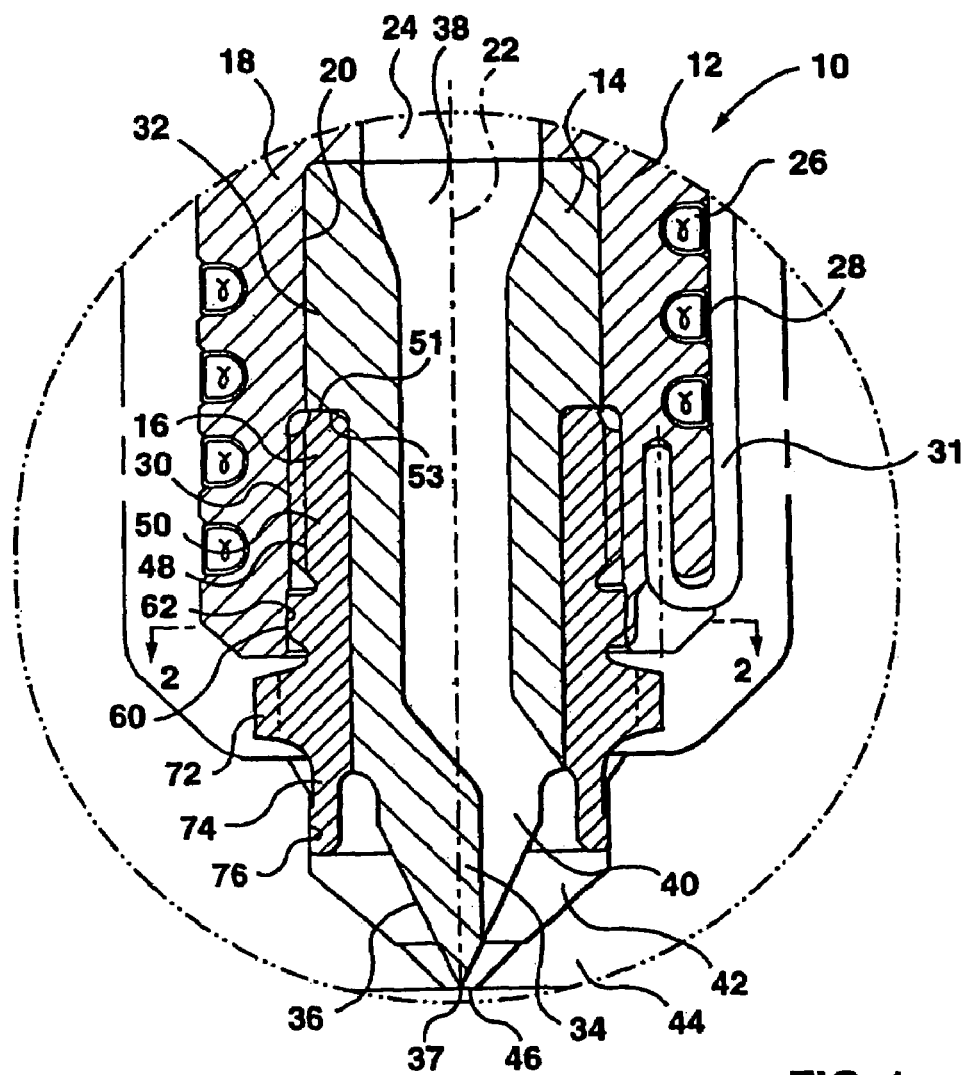
FIG. 1 is a sectional view of an injection nozzle system in accordance with the present invention.
Figure 2:
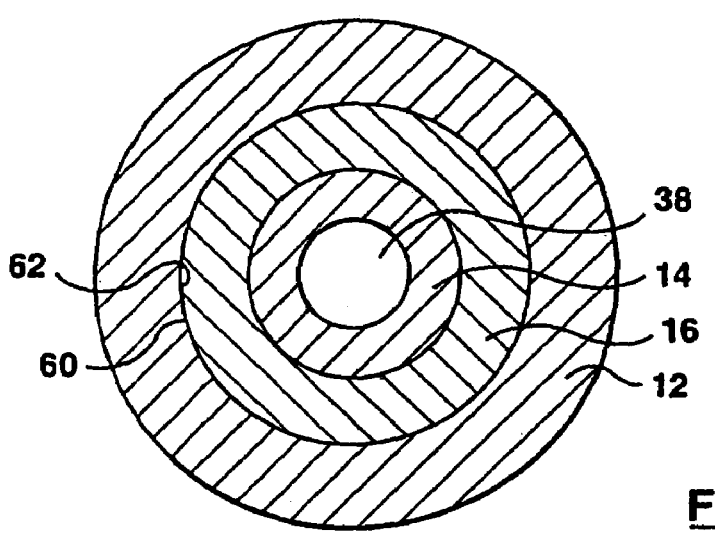
FIG. 2 is a transverse sectional view of the nozzle system of FIG. 1 taken along lines 2—2.
Figure 3:
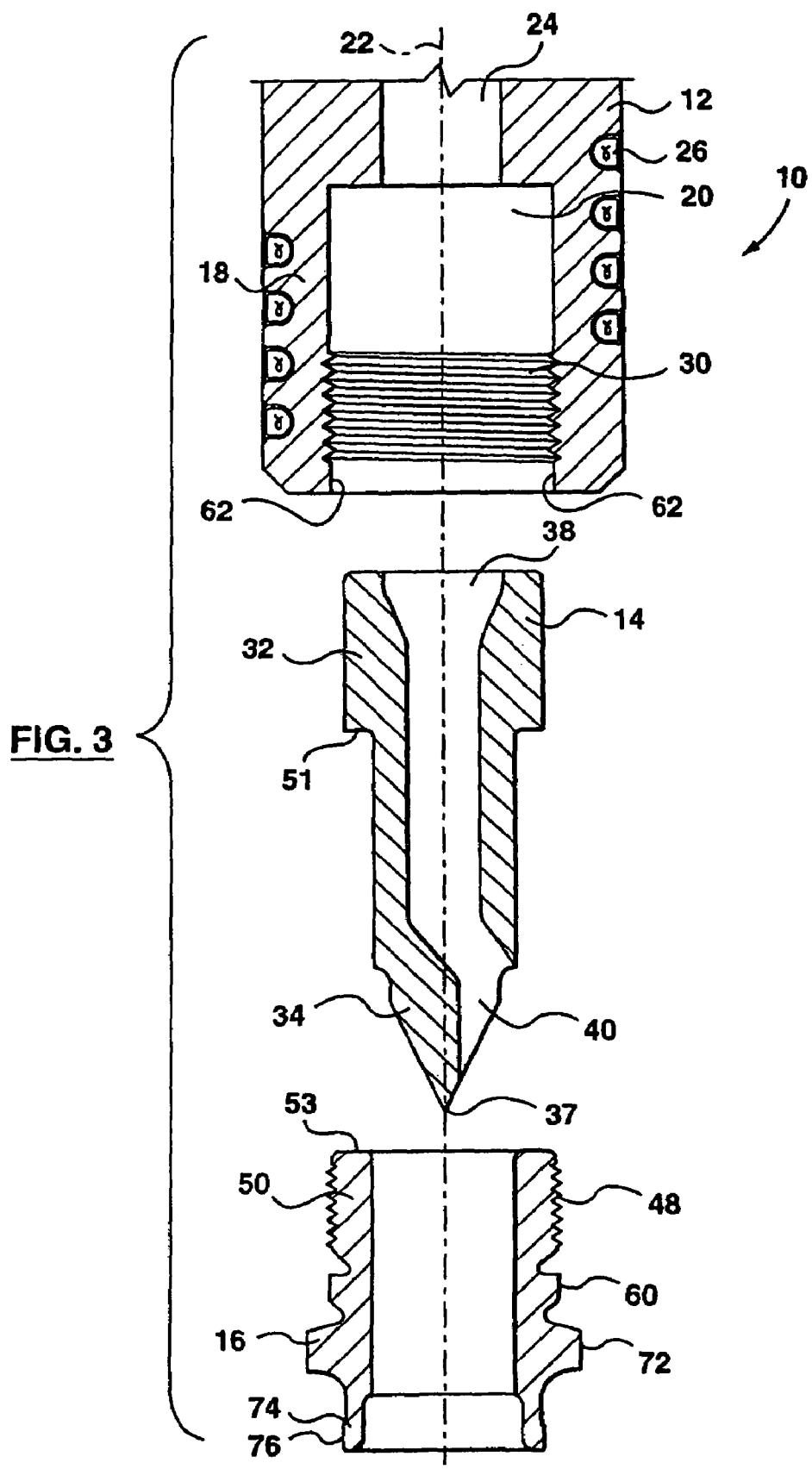
FIG. 3 is an exploded view of the nozzle system of FIG. 1.
Figure 4:
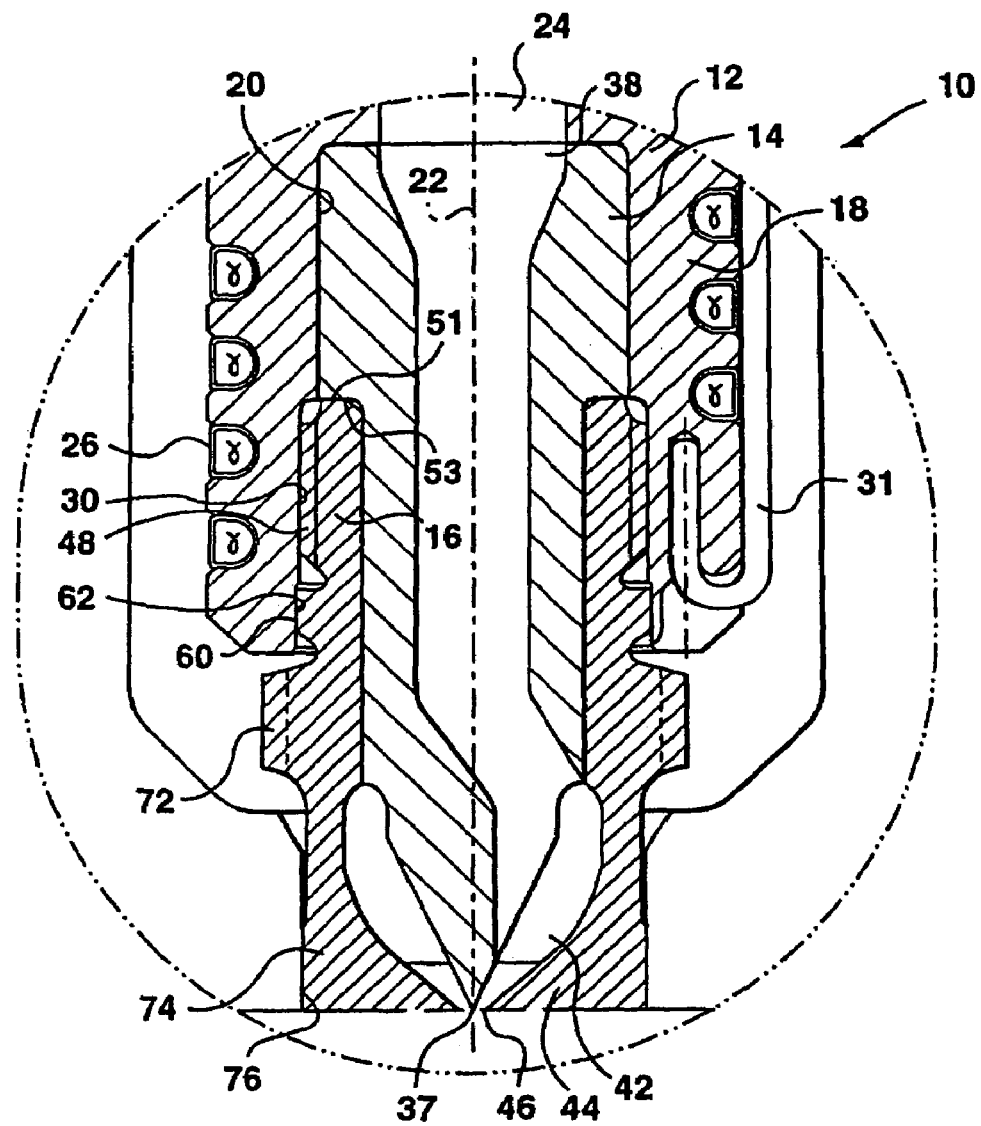
FIG. 4 is a sectional view of a nozzle system in accordance with the present invention, the system being utilized with a direct sprue gate.
Figure 5:
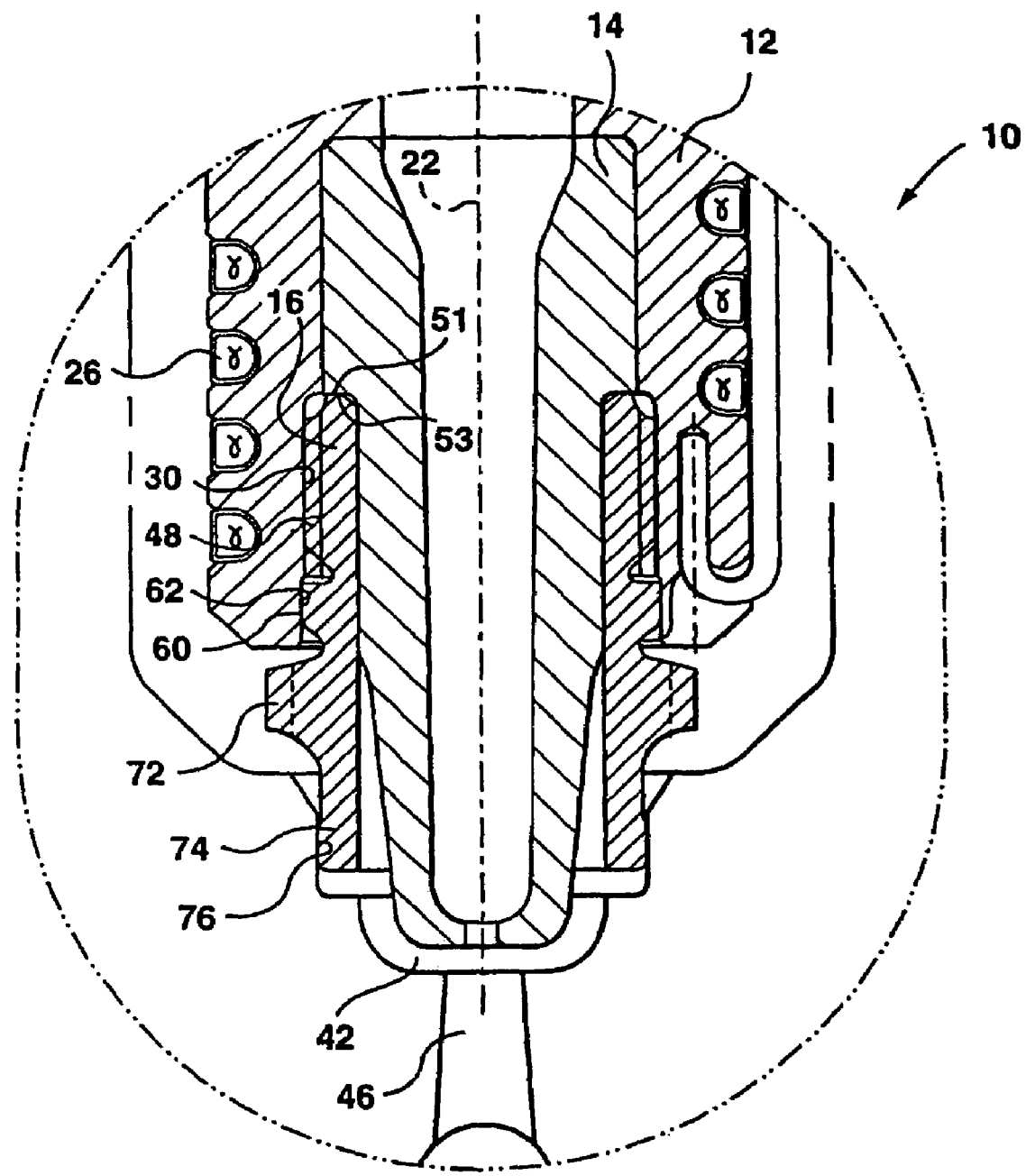
FIG. 5 is a sectional view of a nozzle system in accordance with the present invention, the system being utilized with a hot valve gate.

Referring to FIGS. 1–6, an injection nozzle system in accordance with a first embodiment of the present invention is shown generally at 10. The nozzle system includes a nozzle body 12, a nozzle tip 14, and a nozzle sealing and mounting element 16.

The nozzle system 10 is used with an injection molding machine as is shown and described below and is known in the art (see U.S. Pat. No. 5,658,604 (Gellert) which is hereby incorporated by reference).

Nozzle body 12 has an end 18 that defines a bore 20 along a channel axis 22 for receiving the nozzle tip 14. A melt channel 24 is defined in the nozzle body 12 and opens at the bore 20. Electric heating element 26 extends about the outer circumference of the nozzle body 12 and is supported by a holder 28. A first connection 30 is disposed on the wall of bore 20 on body 12. A thermal couple 31 is disposed in nozzle body 12.

Nozzle tip 14 has a first portion 32 that is sized to fit within bore 20 of nozzle body 12. Nozzle tip 14 also has a second portion 34 that protrudes from the end of nozzle body 12. Second portion 34 defines an outer surface 36 that has opposing tapered walls and is preferably frustoconical in shape. The configuration of second portion 34 below outer surface 36 is preferably conical ending in apex 37. A melt channel 38 is defined through nozzle tip 14 from first portion 32 to section portion 34. Melt channel 38 of nozzle tip 14 aligns with melt channel 24 of nozzle body 12 to permit the flow of pressurized melt from nozzle body 12 to nozzle tip 14. An opening 40 in second portion 34 allows melt to pass from nozzle tip to 14 to a gathering space 42 defined in a mold plate 44 where it collects before entering a mold gate 46.

Nozzle element 16 has a connector portion 48 disposed on a sleeve 50 to connect with first connector 30 of nozzle body 12. Shoulder 51 is defined on nozzle body 12 for engaging endface 53 of nozzle tip 14. Second connector 48 is preferably an internal thread defined on the outer surface of sleeve 50 however other suitable connecting means may be utilized.

Nozzle element 16 also includes alignment bearing 60 that bears against bearing surface 62 defined on nozzle body 12. Alignment bearing 60 and bearing surface 62 are manufactured concurrently at precise tolerances to facilitate precise alignment of nozzle tip 14 with mold gate 46 along channel axis 22. Alignment bearing 60 and bearing surface 62 are of circular cross-section to facilitate precise alignment concentric with axis 22.

A hexagonal flange 72 is disposed on nozzle element 16 to facilitate tightening or loosening the connection of nozzle element 16 with nozzle body 12.

A sealing flange 74 is disposed on nozzle element 16 for contacting mold plate 44 to form a seal against pressurized melt leaking from gathering space 42 to adjacent parts of the molding machine. Sealing flange 74 has an abutment face 76 that abuts against the surface of mold plate 44 to form the desired seal.

In use, nozzle element 16 performs the functions of connecting nozzle tip 14 to nozzle body 12, aligning nozzle tip 14 with mold gate 46 and sealing nozzle system 10 against mold plate 44. Importantly, alignment bearing 60 engages bearing surface 62 to facilitate precise alignment of nozzle tip 14 with mold gate 46 along axis 22.

It should be understood that nozzle system 10 of the present invention is not limited to use with mold gates.

Figure 6:
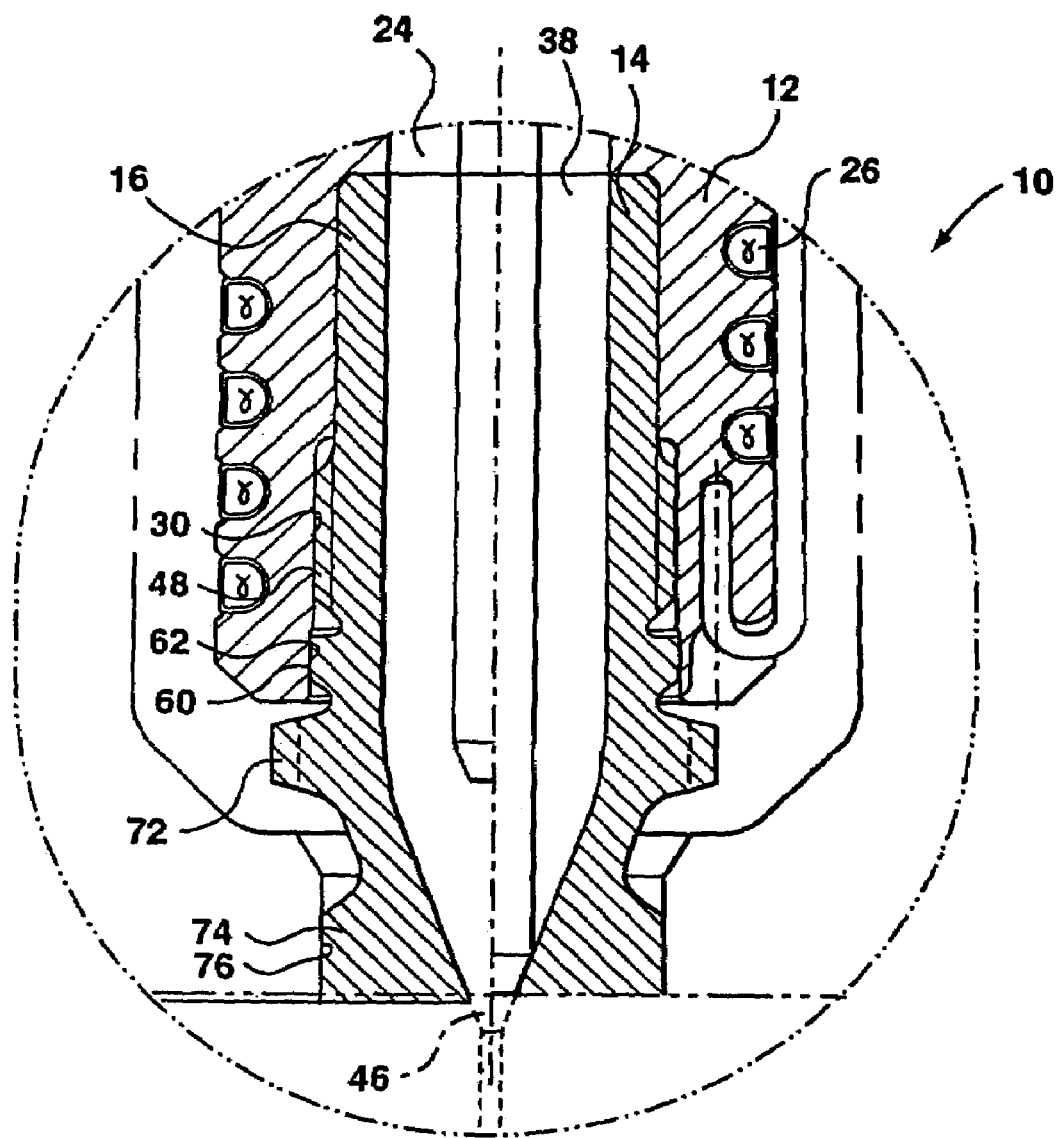
FIG. 6 is a sectional view of a nozzle system in accordance with the present invention, the system being utilized with a cylindrical valve gate.

Nozzle system 10, and in particular the alignment structures of nozzle tip 14 and nozzle element 16 may be incorporated in a variety of alternative gate applications to actively connect and locate nozzle tip 14 with a gate. Examples are provided in FIGS. 4–6 which show use with a direct sprue gate (FIG. 4), a hot valve gate (FIG. 5), and a cylindrical valve gate (FIG. 6). Note in FIG. 6 that nozzle tip 14 and nozzle element 16 are integrally formed. For convenience, corresponding reference numbers have been assigned to corresponding elements described above.

Figure 7:
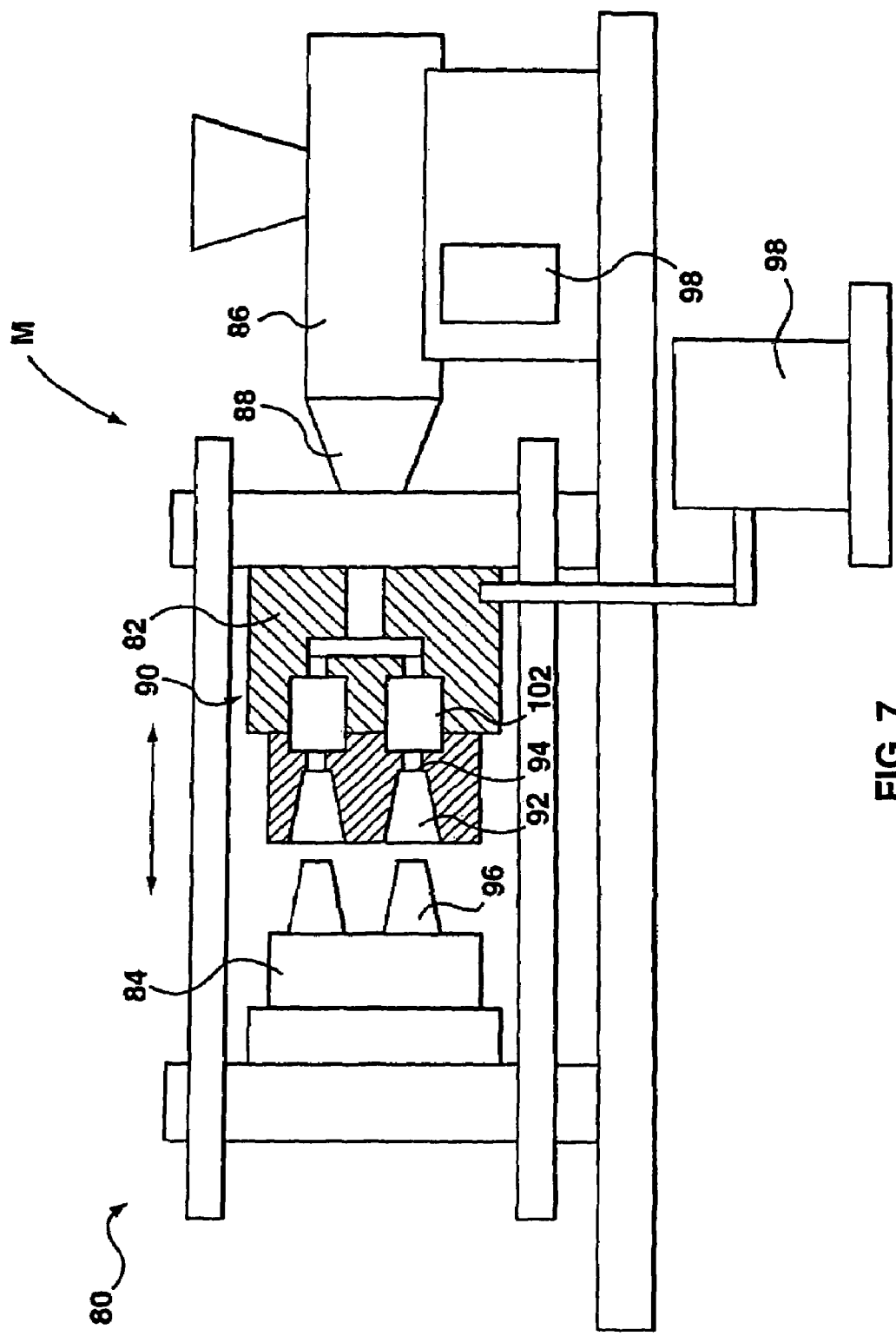
FIG. 7 is a sectional view of an injection molding machine utilizing a nozzle system in accordance with the present invention.

An injection molding machine incorporating an injection nozzle system in accordance with the present invention is shown generally at M in FIG. 7. Machine M includes a frame 80 that supports a stationary platen 82 and at least one movable platen 84. Stationary platen 82 is fluidly connected to a melt extruder 86 with a sprue bushing 88 for receiving a pressurized melt. A hot runner injection system 90 is disposed in stationary platen 82 as described further below and shown in FIG. 8. Mold cavities 92 are disposed at the end of mold gates 94 for injection system 90. Mold cores 96 are movably disposed in mold cavities 92 by movement of movable platen 84. Operation of injection system 90 is controlled with controller 98.

Figure 8:
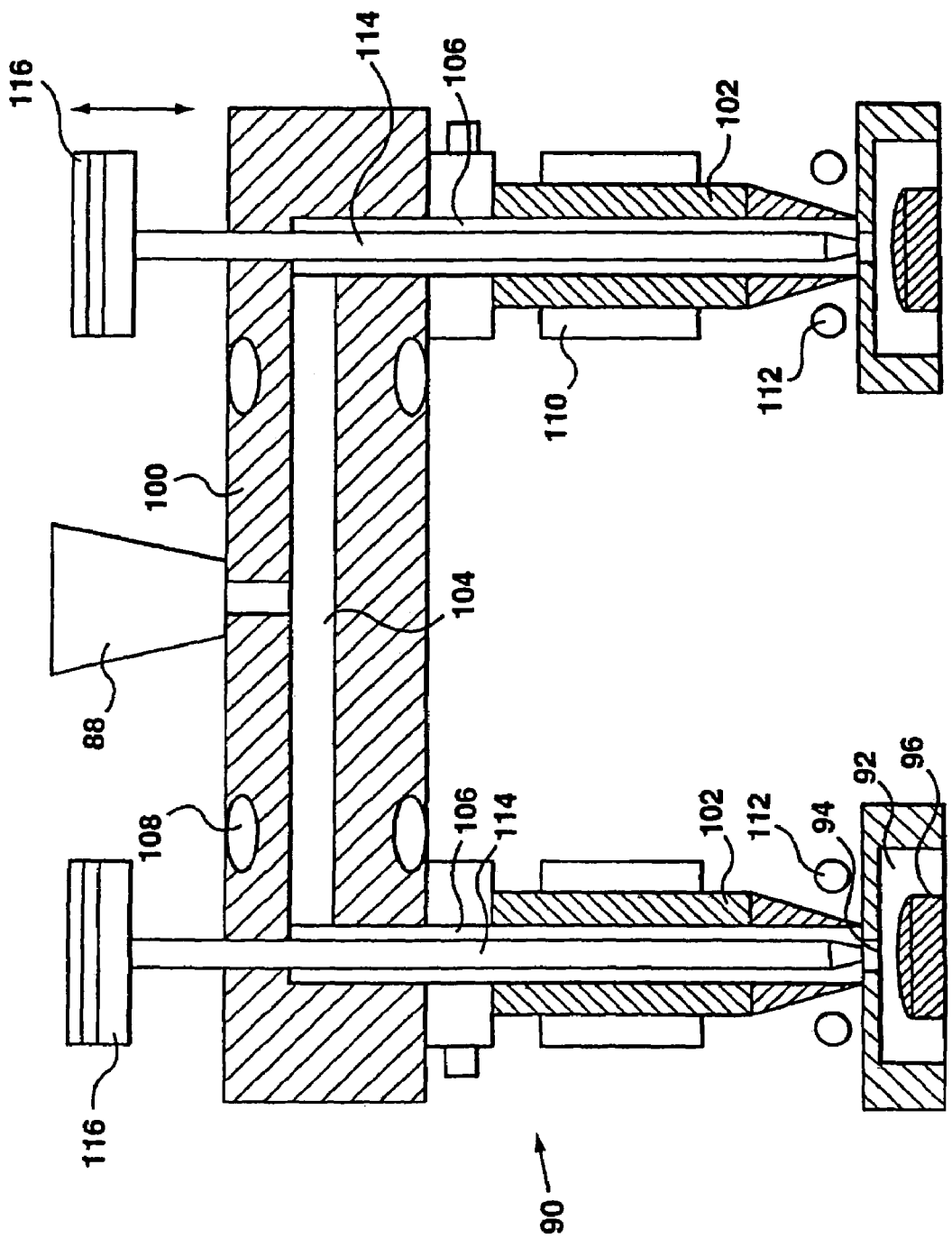
FIG. 8 is a sectional view of the hot runner injection nozzle system for the machine of FIG. 7.

Referring to FIG. 8, injection system 90 may be seen in better detail. Injection system 90 includes a manifold 100 and injection nozzles 102. A melt channel 104 is defined in manifold 100 for conveying melt from sprue bushing 88 to injection nozzles 102. Injection nozzles 102 each define melt channels 106 for conveying melt from manifold 100 to melt cavities 92. Manifold heaters 108, nozzle heaters 110 and cooling channels 112 are disposed in injection system 90 and controlled by controller 98 to maintain the temperature of melt at a desired level.

Injection nozzles 102 depicted in FIG. 8 are for a valve gated injection system. The nozzles 102 are shown in general detail in FIG. 5. More specific details of the nozzles and in particular the nozzle systems in accordance with the present application are described and shown in the remaining figures provided herein.

The valve gated nozzles 102 each include a valve pin 114 that travels in melt channel 106. Valve pins 114 are moved by actuator 116 under control by controller 98. As a result, valve pins 114 are moved in relation to movement of platen 84 in order to inject and pack melt into melt cavities 92 to produce molded parts.

Referring to FIGS. 9–23 an injection nozzle system in accordance with another embodiment of the present invention is shown generally at 220. Apparatus 220 comprises a nozzle 222 defining a melt channel 224. A valve pin 226 is disposed in melt channel 224. Nozzle 222 is disposed in a mold cavity plate 225. Valve pin 226 is mounted to a piston (not shown) for reciprocating valve pin between an open position and a closed position relative to a gate 228 defined in mold cavity plate 225 leading to a mold cavity (not shown). A gathering space 229 is defined between the end of nozzle 222 and mold cavity plate 225 for receiving and heating melt that has not passed through gate 228.

Nozzle 222 includes a nozzle body 230 having a cylindrical bore 232 for receiving a nozzle tip 234. An electrical heating element 236 extends about the outer circumference of nozzle body 230. A thermocouple 238 is disposed in an opening defined in nozzle body 230 adjacent to nozzle tip 234.

Nozzle tip 234 is removably secured within bore 232 with a nozzle seal 240. Nozzle seal 240 depicted in FIG. 9 has an externally threaded portion (not shown) that engages an internally threaded portion (not shown) of nozzle body 230 to secure the parts together. Nozzle seal 240 abuts a shoulder 242 defined in nozzle tip 234 to urge nozzle tip 234 into sealed engagement with the end of bore 232. Alternative arrangements for securing nozzle tip 234 to nozzle body 230 are described further below and shown in FIGS. 16–21.

Nozzle 222 is made of materials having relatively high thermal conductivity and a high degree of wear resistance. Nozzle body 230 and nozzle seal 240 are preferably formed from titanium, H-13 or other suitable materials that may be obtained and manufactured at reasonable costs. Nozzle tip 234 is preferably formed of tungsten carbide due to its superior heat transfer properties although other thermally conductive materials may be utilized.

Figure 9:
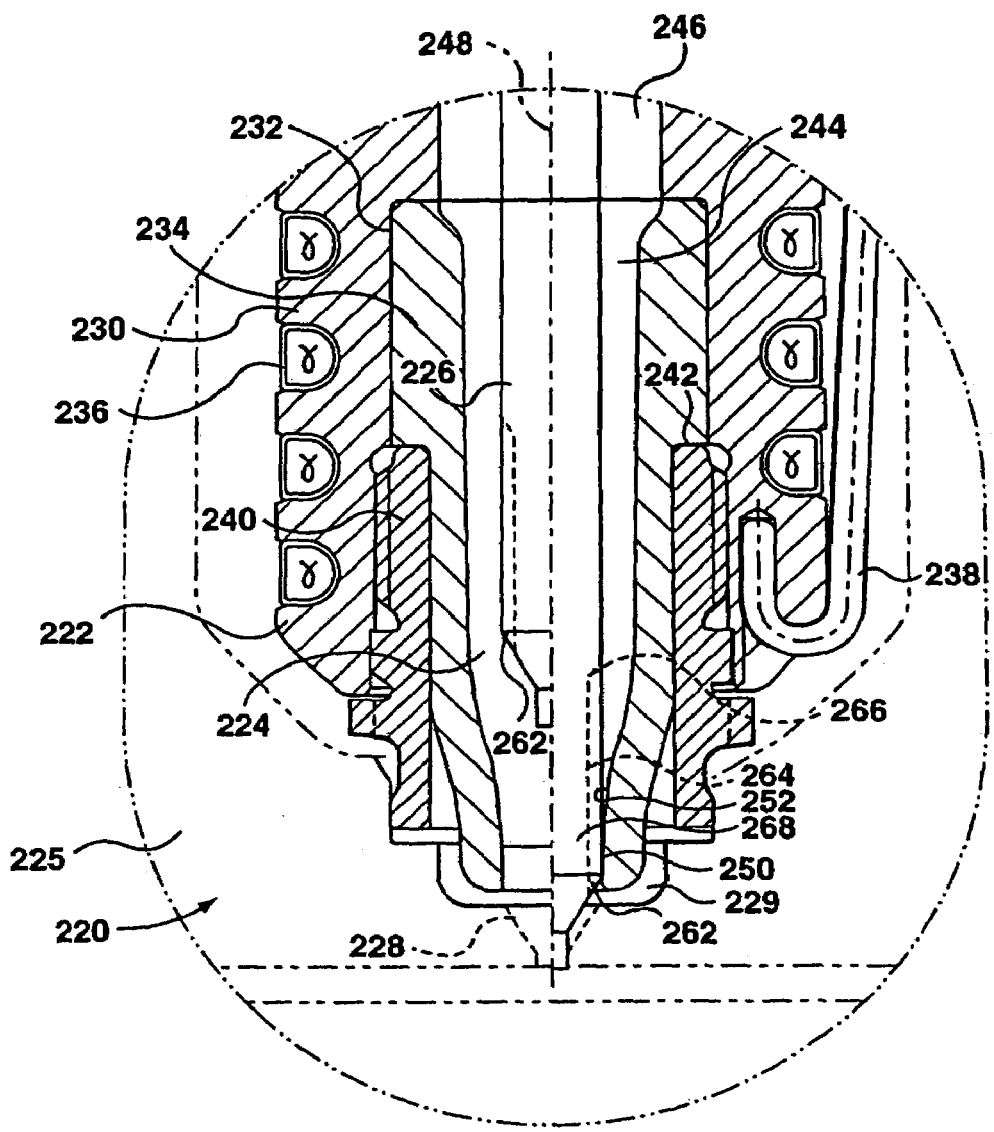
FIG. 9 is a split sectional view of a portion of a valve gated injection apparatus in accordance with a further embodiment of the present invention, the left hand side of FIG. 9 showing the valve pin of the apparatus in an open position and the right hand side of FIG. 9 showing the valve pin in a near closed position.

Referring to FIG. 9, melt channel 224 has a first portion 244 defined through nozzle tip 234 and a second portion 246 defined through nozzle body 230. First portion 244 and second portion 246 are aligned along a center axis 248 for gate 228. First portion 244 includes a guiding surface 250 that is arranged coaxially with gate axis 248 to guide valve pin 226 into alignment with gate 228 as it moves from an open position to a closed position. First portion 244 also includes a channel surface 252 extending in a gradual outward curve from guiding surface 250 for encouraging melt to flow around valve pin 226 to and from gate 228 in a manner that places reduced stress on the melt.

Figure 10:
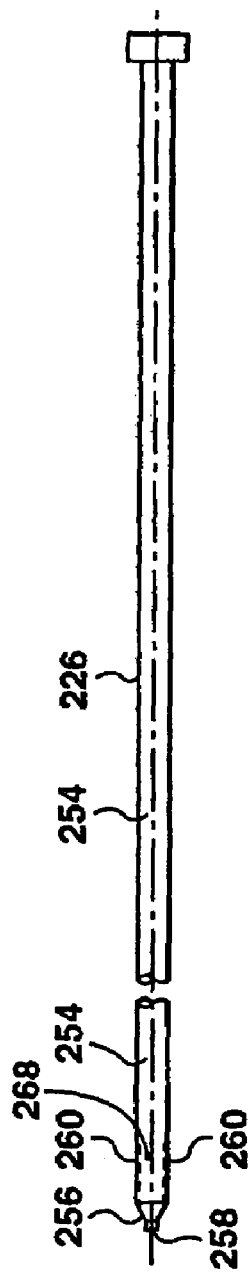
FIG. 10 is a plan view of the valve pin for the apparatus of FIG. 9.
Figure 12:
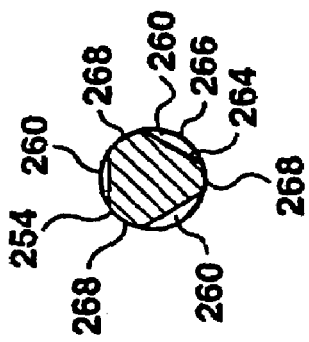
FIG. 12 is a sectional view of the valve pin as viewed along lines 12—12 of FIG. 11.
Figure 11:
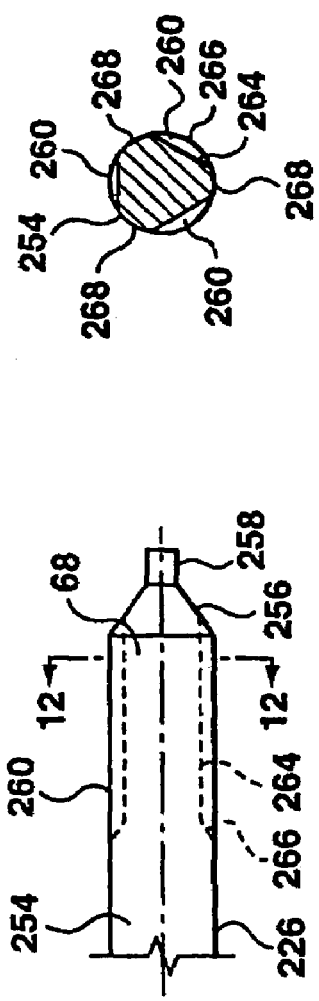
FIG. 11 is an enlarged view of the end of the valve pin of FIG. 9.

Referring to FIGS. 10–12, valve pin 226 has a cylindrical stem 254 with a frusto-conical head 256 ending in a cylindrical tip 258. Flow surfaces 260 are defined in frusto-conical head 256 and in cylindrical stem 254 of valve pin 226 to define flow channels 262 between valve pin 226 and channel surface 252. Flow surfaces 260 extend between stem 254 and frusto-conical head 256 to permit backflow of melt when frusto-conical head 256 is becoming seated in gate 228. Flow surfaces 260 have a generally planar portion 264 and a tapered end portion 266 to encourage backflow of melt in a manner that is not overly stressful to the melt. It is contemplated that flow surfaces 260 may instead have non-planar surfaces (such as rounded flutes) to accommodate an increased volume of backflow.

Bearing surfaces 268 are defined between flow surfaces 260 for bearing against guiding surface 250 to guide valve pin 226 into alignment with gate 228. FIG. 11 shows an embodiment in which three generally rounded bearing surfaces 268 are defined between three, generally planar flow surfaces 260. It is contemplated that at least three bearing surfaces 268 would be defined in stem 254 to permit precise alignment of valve pin 226 within gate 228.

In use, valve pin 226 is first retracted to an open position as shown on the left side of FIG. 9 to permit flow of melt through melt channel 224 and through gate 228 to fill mold cavity (not shown). Heat is transferred to melt from electrical heating element 236 in nozzle body 230 via highly thermally conductive nozzle tip 234. Once mold cavity is filled, valve pin 226 is moved from an open position to a closed position to seal gate 228. As valve pin 226 moves to a closed position it is guided by bearing surfaces 268 slidably bearing against guiding surface 250. As frusto-conical head 256 of valve pin 226 approaches a closed position in gate 228 as shown on the right side of FIG. 9, excess melt is guided away from gate 228 into gathering space 229 and along flow channels 262 into melt channel 224. Advantageously, if maintenance or a color change in melt is required then nozzle tip 234 may be quickly removed from nozzle body 230 by removing threaded nozzle seal 240.

Figure 13:
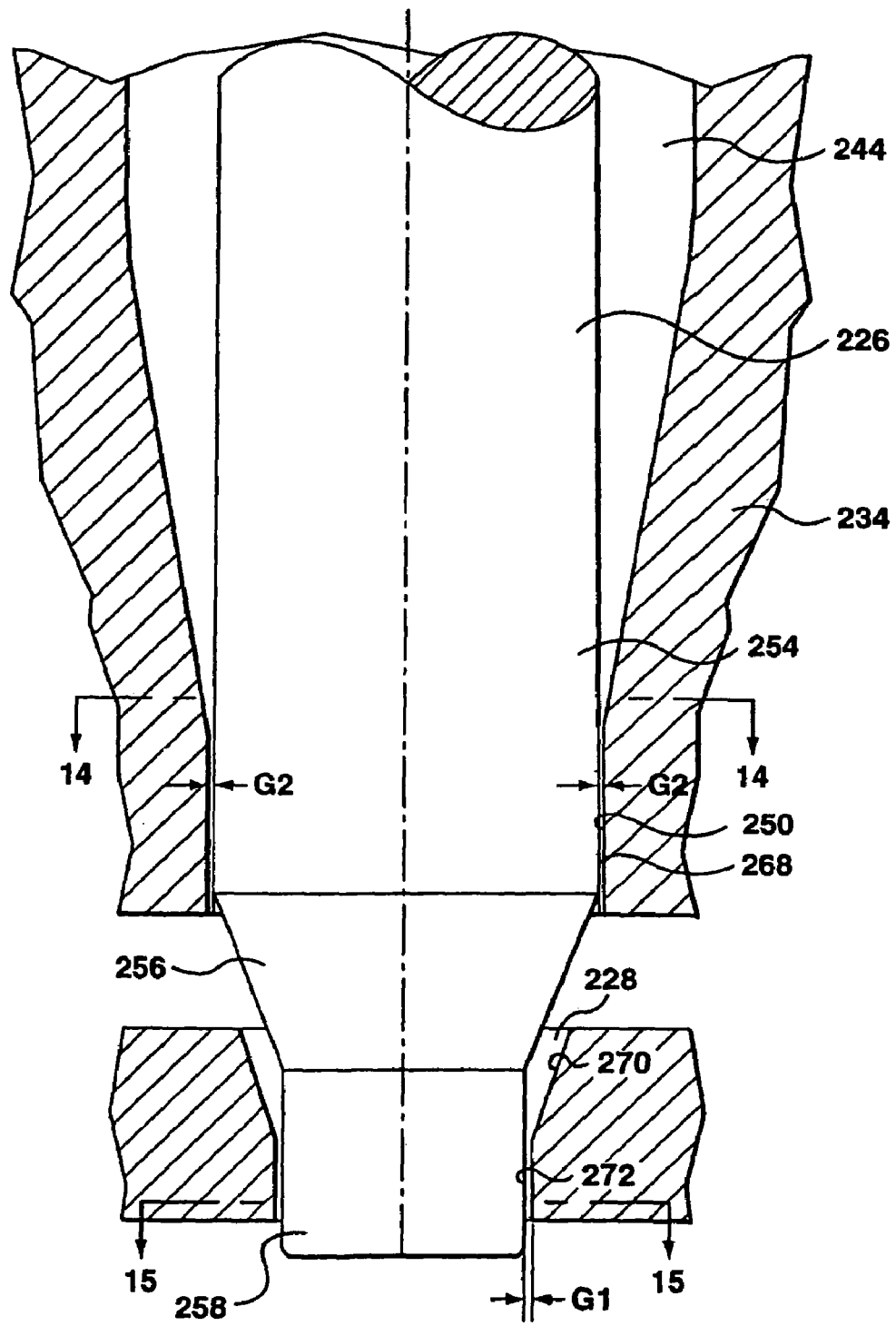
FIG. 13 is a sectional view of a portion of a valve gated injection apparatus according to another embodiment of the present invention showing the valve pin in a closed position.
Figure 14:
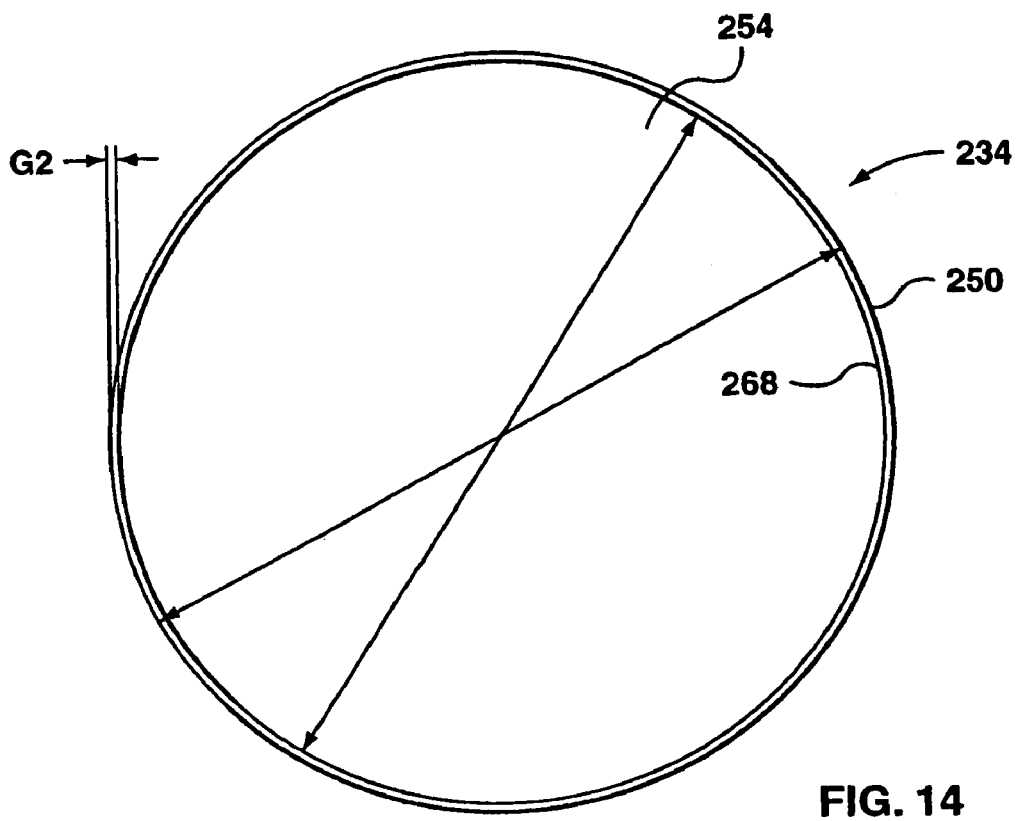
FIG. 14 is a sectional view of the apparatus shown in FIG. 13, as viewed along lines 14—14.
Figure 15:
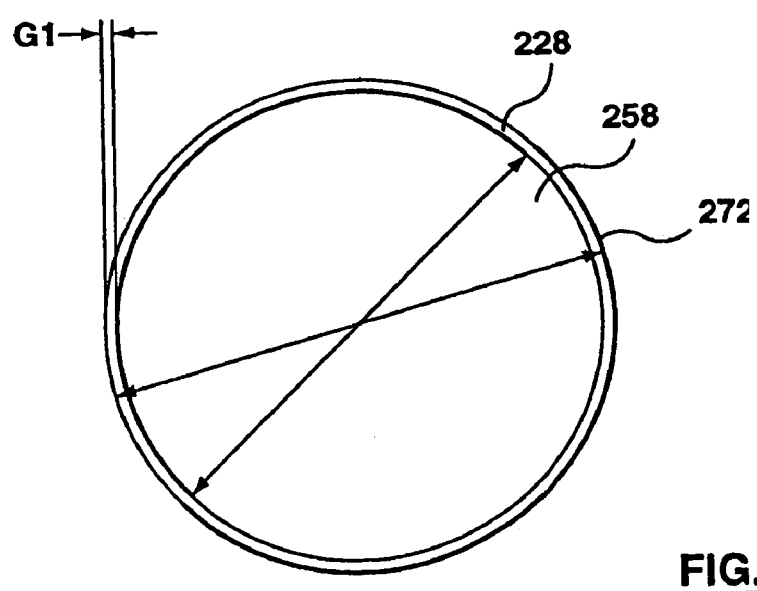
FIG. 15 is a sectional view of the apparatus shown in FIG. 13, as viewed along lines 15—15.

Referring to FIGS. 13–15, a second embodiment of valve gated injection apparatus in accordance with the present invention is shown at 220. The same reference numerals are used to identify elements corresponding to elements of the earlier described embodiment.

FIG. 13 shows valve pin 226 disposed in a closed position within gate 228. First portion 244 of melt channel 224 defines guiding surface 250 for guiding valve pin 226. Gate 228 has a frusto-conical surface 270 and a cylindrical surface 272 for receiving tip 258. Valve pin 226 has a cylindrical stem 254 above frusto-conical head 256 that defines bearing surface 268 (i.e. there are no flow surfaces 260 other than bearing surface 268 itself).

Referring to FIGS. 14 and 15, a first tolerance gap G1 is defined between tip 258 and cylindrical surface 272 and a second tolerance gap G2 is defined between bearing surface 268 and guiding surface 250. Gap G1 is greater than gap G2. In this manner, minute variances in alignment of bearing surface 268 relative to guiding surface 250 will not be sufficient to cause tip 258 to become damaged by engaging frusto-conical surface 270. It should be noted that bearing surface 268 does not bear immediately upon guiding surface 250 and tip 258 does not bear against surface 272. Instead, a small amount of melt is forced into gaps G1 and G2 by back pressure. Melt acts as a lubricant to reduce wear on valve pin 226 and melt channel 224.

Referring to FIGS. 16–21, further embodiments of the valve gated injection apparatus in accordance with the present invention are shown. Once again, corresponding reference numbers are used to refer to corresponding elements of earlier described embodiments.

Figures 16, 17:
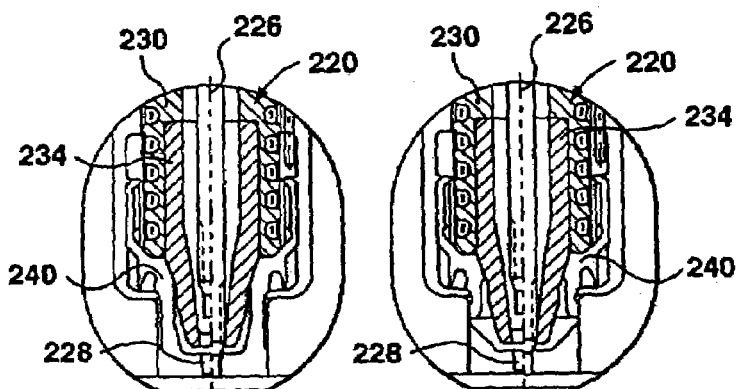
FIGS. 16–21 are split sectional views of the valve gated injection apparatus in accordance with further embodiments of the present invention.

FIG. 16 shows an apparatus with a hot valve with a nozzle seal 240 having an internal thread (not shown) engaging a corresponding external thread (not shown) defined on nozzle body 230.

FIG. 17 shows an apparatus 220 having a cylindrical valve gate 228 and a nozzle seal 230 similar to the embodiment of FIG. 16.

Figures 18, 19:
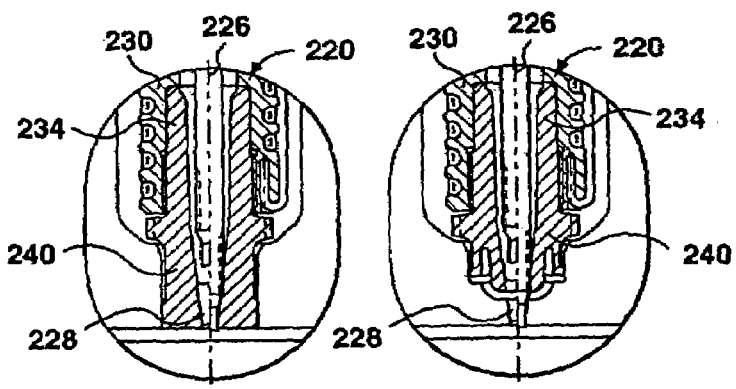

FIG. 18 shows an apparatus 220 with a hot valve having a nozzle tip 234 and nozzle seal 240 integrally formed as one piece.

FIG. 19 shows an apparatus 220 having a cylindrical valve gate 228 with a one piece integral nozzle tip 234 and nozzle body 240 similar to the embodiment of FIG. 18.

Figures 20, 21:
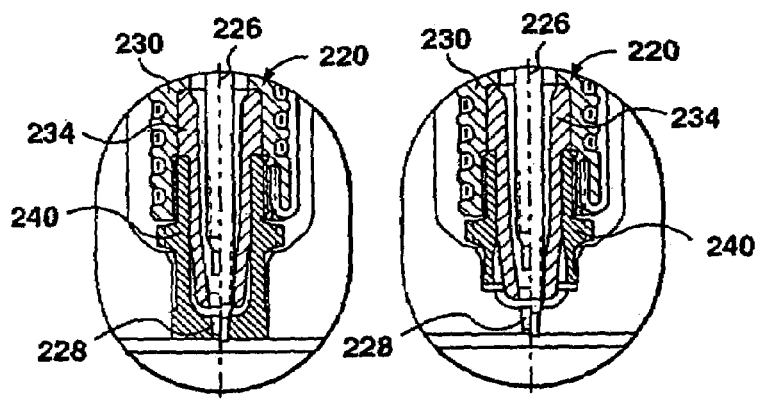

FIG. 20 shows an apparatus 220 with a hot valve having a nozzle seal 240 having an external thread (not shown) for engaging a corresponding internal thread (not shown) defined on nozzle body 230.

FIG. 21 shows an apparatus 220 with a cylindrical valve gate 228 and a nozzle seal similar to FIG. 9.

Figure 22:
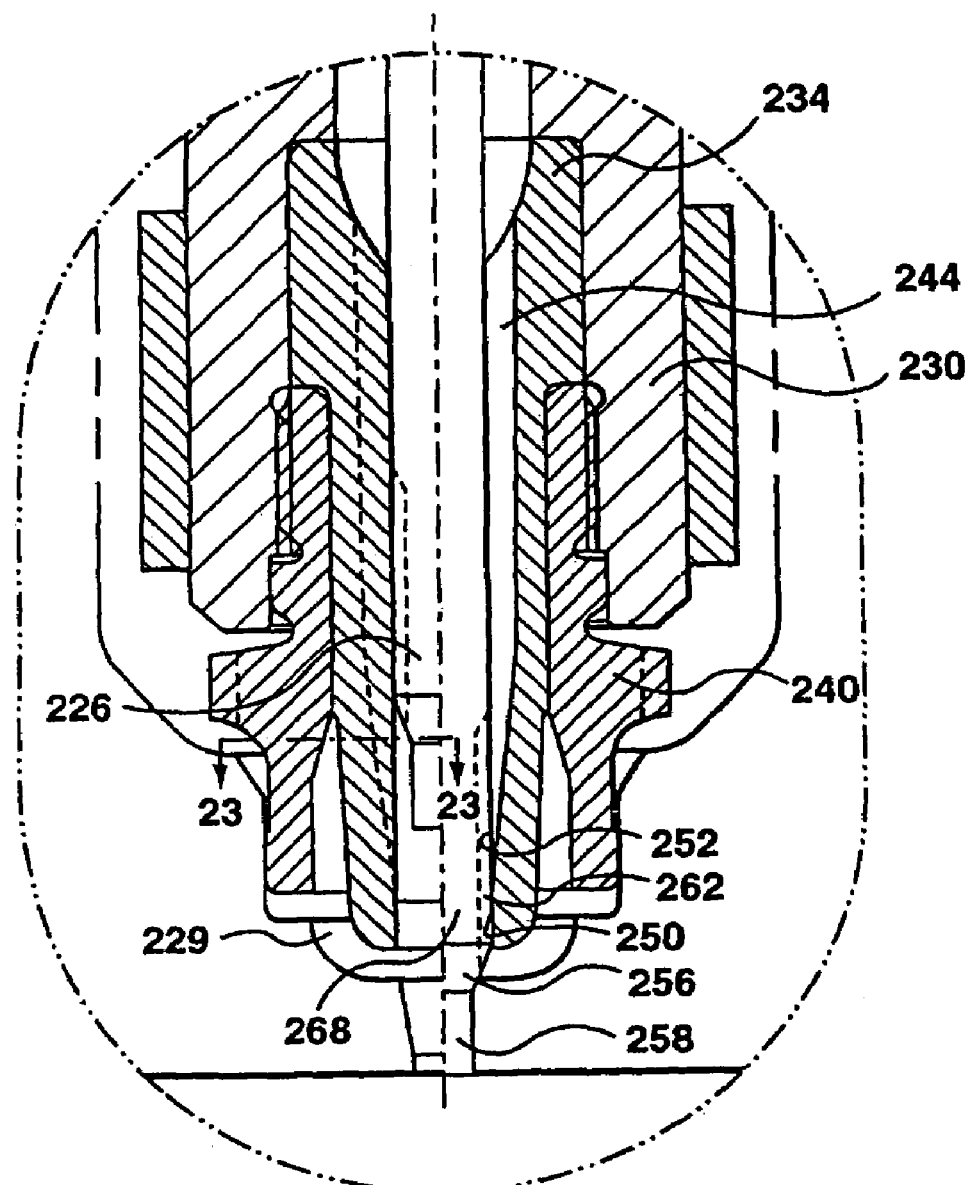
FIG. 22 is a split sectional view of another embodiment of the nozzle system shown in FIG. 9.
Figure 23:
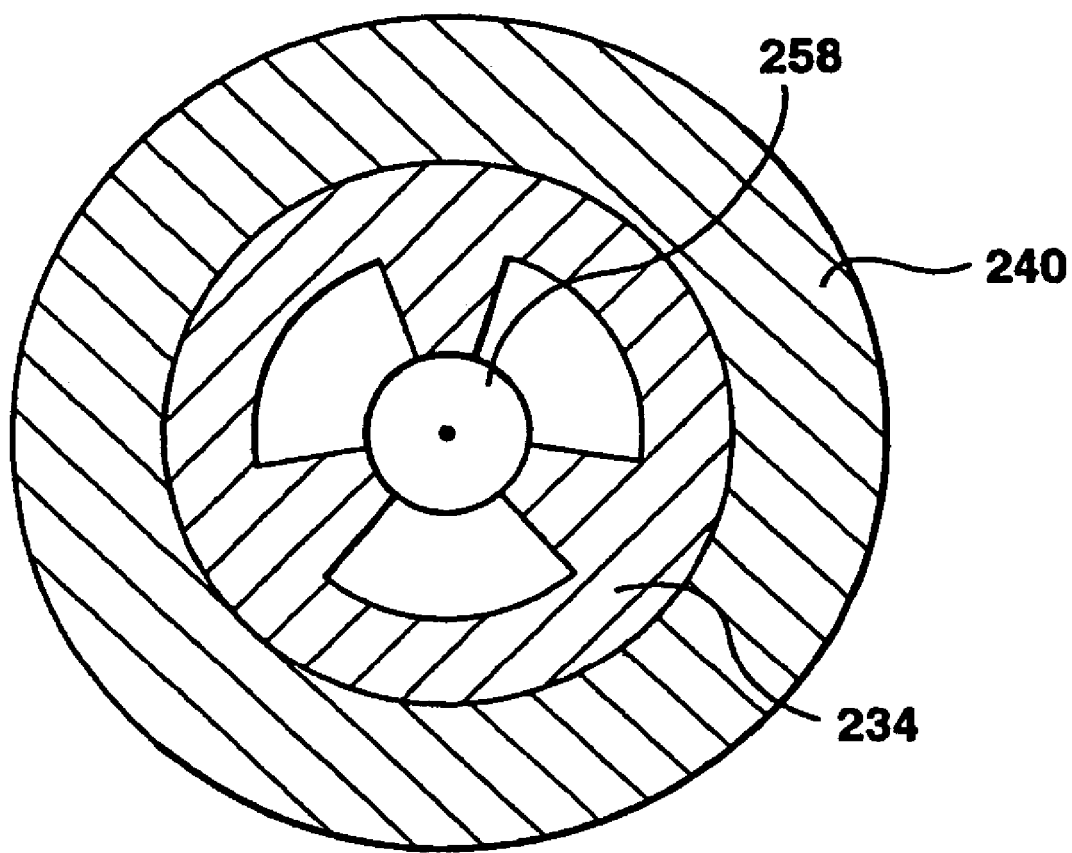
FIG. 23 is a sectional view of the nozzle system of FIG. 22 taken along lines 23—23.

FIGS. 22 and 23 show another embodiment of the device shown in FIG. 9 with a different configuration of flow surfaces and bearing surfaces.

Nozzle tip 234 is removably secured to the nozzle body 230 by nozzle seal 240, which is coupled to the nozzle body 230 by threaded connection 233. The nozzle tip 234 includes an outer surface D that abuts an inner surface C of the nozzle seal 240. Alignment bearing B abuts an inner surface of the nozzle body to align the nozzle tip 234 with the mold gate. Outer surface A of the nozzle seal abuts mold plate 225 to locate the nozzle seal 240 relative to the mold gate.

Guiding ribs 33 project from an inner surface of the nozzle tip 234 into the melt channel 224. The guiding ribs 33 are generally equally spaced about the inner surface of the nozzle tip 234 and are sized to engage valve pin 226, as shown in FIG. 23. The valve pin 226 is continuously in contact with the guiding ribs 33 as the valve pin reciprocates between an open position, which is shown on the left of FIG. 22, and a closed position, which is shown on the right of FIG. 22. As the valve pin 226 moves toward the closed position, the forward end of the valve pin 226 engages guiding surface 250 of the nozzle tip 234.

Figure 24:
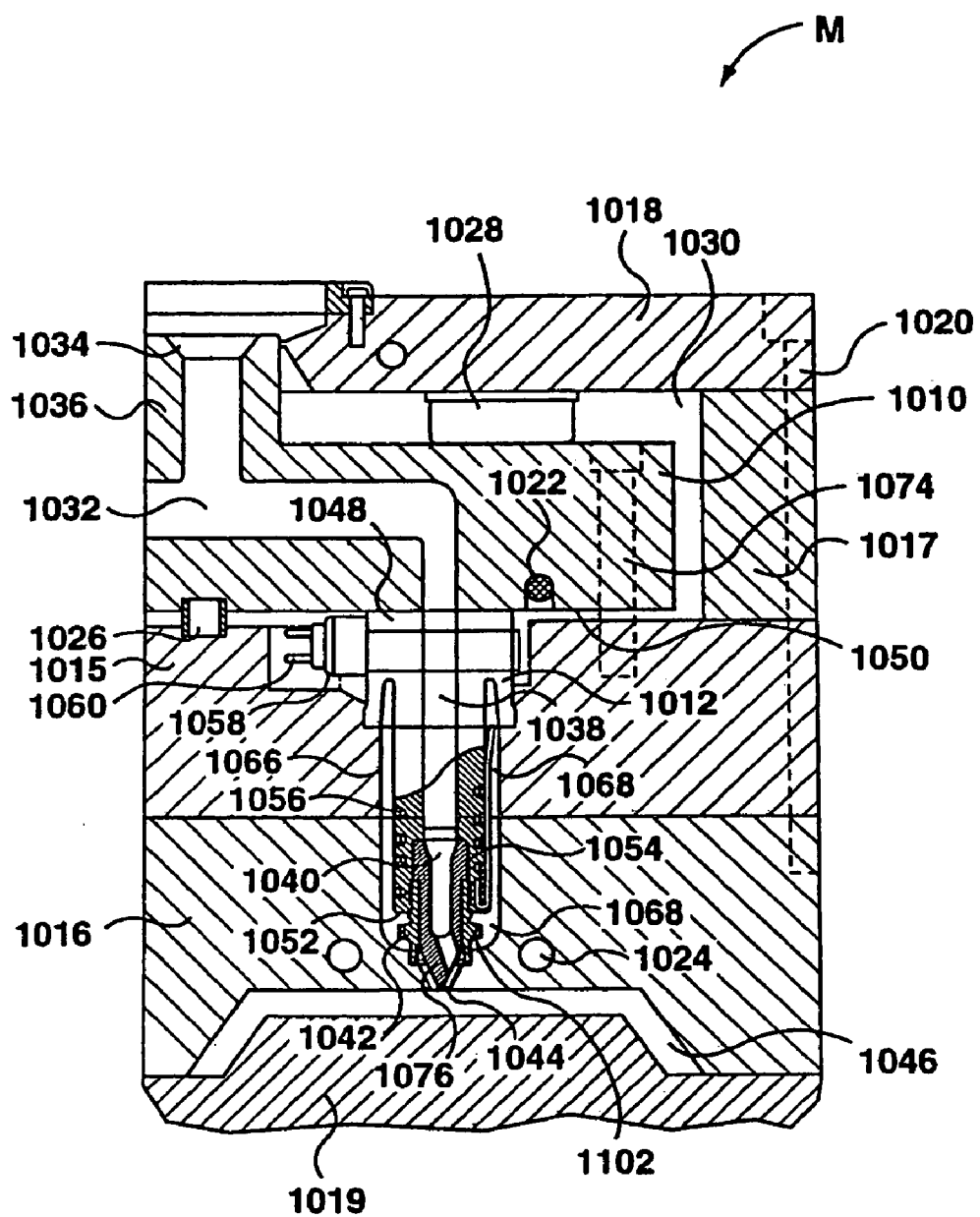
FIG. 24 is a sectional view of an injection molding system incorporating a removable multi-material nozzle tip according to a preferred embodiment of the present invention.

A portion of a multi-cavity injection molding system or apparatus made in accordance with another embodiment of the present invention is shown in the Figures generally at M. Referring to FIG. 24, apparatus M has a melt distribution manifold 1010 interconnecting several heated nozzles 1012 in a mold 1014. While mold 1014 usually has a greater number of plates depending upon the application, in this case a nozzle mold platen 1015, cavity plate 1016, a support plate 1017, a back plate 1018 and under cavity platen 1019, which are secured together by bolts 1020, are shown for ease of illustration. The melt distribution manifold 1010 is heated by an integral electrical heating element 1022 and mold 1014 is cooled by pumping cooling water through cooling conduits 1024. Melt distribution manifold 1010 is mounted between cavity plate 1016 and back plate 1018 by a central locating ring 1026 and insulative spacer members 1028 which provide an insulative air space 1030 between heated manifold 1010 and surrounding mold 1014.

A melt passage 1032 extends from a central inlet 1034 in a cylindrical inlet portion 1036 of manifold 1010 and branches outward in manifold 1010 to convey heated melt through a central bore 1038 in each of heated nozzles 1012. Heated melt then flows through a melt duct 1040 in an integral nozzle seal and tip 1042 according to the present invention to a gate 1044 extending through cavity plate 1016 leading to a cavity 1046. Each nozzle 1012 has a rear end 1048 which abuts against front face 1050 of melt distribution manifold 1010 and a front end 1052 with a threaded seat 1054 extending around central melt bore 1038. An electrical heating element 1056 extends in the nozzle 1012 integrally around central melt bore 1038 to an external terminal 1058 to receive power through leads 1060. Nozzle 1012 is seated in a well 1062 in cavity plate 1016 with an insulative air space 1068 between heated nozzle 1012 and cooled mold 1014. Nozzles 1012 are securely retained in wells 1062 by bolts 1074 which extend from manifold 1010 into cavity plate 1016.

Figure 25:
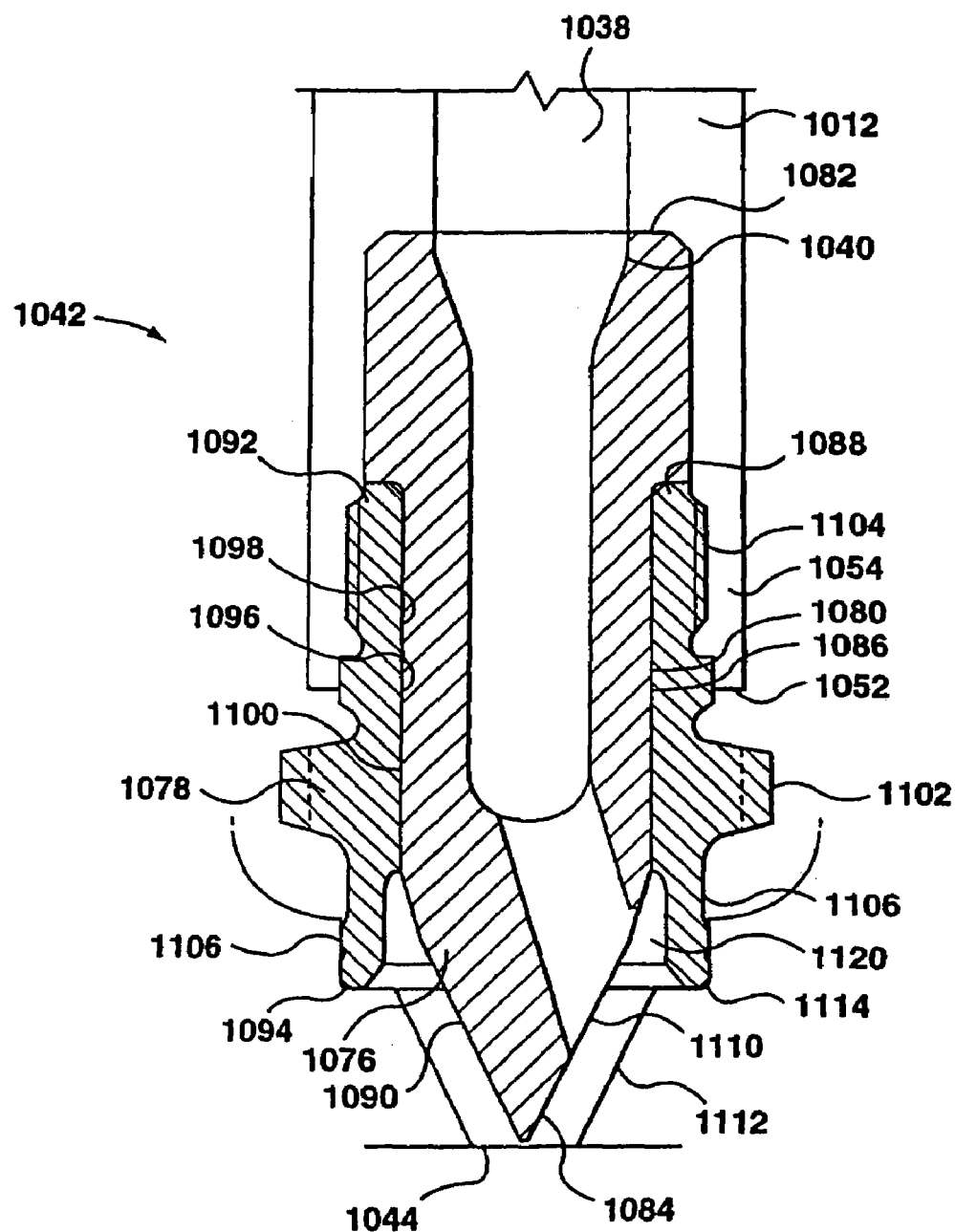
FIG. 25 is an enlarged sectional view of the nozzle tip of FIG. 24.

Referring to FIG. 25, integral nozzle seal and tip 1042 has a tip member 1076 integrally joined to a sleeve member 1078. As will be described below, sleeve 1078 performs a sealing function and a connecting function. Tip 1076 has an outer surface 1080, a rear end 1082, and a front end 1084 and melt duct 1040 extending from rear end 1082 to front end 1084. Outer surface 1080 has a substantially smooth (i.e. unthreaded) cylindrical portion 1086 extending between a shoulder 1088, which extends outwardly near the rear end 1082, and a portion 1090, which tapers inwardly to the front end 1084. Sleeve 1078 of integral nozzle seal and tip 1042 has a rear end 1092, a front end 1094, and an inner surface 1096 with a substantially smooth (i.e. unthreaded) cylindrical portion 1098 which fits around the cylindrical portion 1086 of the outer surface 1080 of the tip 1076. Tip 1076 is integrally attached to sleeve 1078 at an interface 1100 where portion 1086 of outer surface 1080 and portion 1098 of inner surface 1096 contact one another, as will be described in more detail below. Sleeve 1078 also has a hexagonal nut-shaped portion 1102 extending between a rear portion 1104 and a cylindrical front seal portion 1106. Rear portion 1104 is threaded and adapted to engage mating threads in seat 1054 in front end 1052 of nozzle 1012. Melt duct 1040 through tip 1076 of integral nozzle seal and tip 1042 is aligned with central melt bore 1038 through nozzle 1012 and leads to an outlet 1110 at front end 1084 and is aligned with gate 1044. The nut-shaped intermediate portion 1102 extends outwardly into insulative air space 1068 between front end 1052 of the heated nozzle and cooled mold 1014 and is engageable by a suitable tool to tighten integral nozzle seal and tip 1042 in place or remove it for cleaning or replacement if necessary, as will be described further below. Sleeve 1078 of integral nozzle seal and tip 1042 extends forwardly towards gate 1044 and seal portion 1106 of sleeve 1078 is in sealing contact with cylindrical surface 1114 of opening 1112 to prevent pressurized melt escaping into insulative air space 1068.

Tip 1076 may be made of a corrosion and wear resistant material such as tungsten carbide or may be a highly thermally conductive material such as beryllium copper (BeCu) or other copper alloys. Sleeve 1078 of integral nozzle seal and tip 1042, which is in contact with both heated nozzle 1012 and cooled mold 1014, is made of a material which is less thermally conductive, and preferably much less thermally conductive, than the tip 1076. Materials such as a high speed steel, H13 stainless steel and titanium are preferred. Tip 1076 is integrally attached to sleeve 1078, preferably by nickel alloy brazing, along an interface 1100.

Referring again to FIG. 24, in use electrical power is applied to heating element 1022 in manifold 1010 and to heating elements 1056 in nozzles 1012 to heat them to an operating temperature. Pressurized melt is provided from a molding machine (not shown) to central inlet 1034 of melt passage 1032 according to a predetermined cycle. The melt flows through melt distribution manifold 1010, nozzles 1012, integral nozzle seal and tip 1042 and gate 1044 into cavity 1046. After cavity 1046 is filled and a suitable packing and cooling period has expired, the injection pressure is released and the melt conveying system is decompressed to avoid stringing through open gates 1044. The mold 1014 is then opened to eject the molded product. After ejection, mold 1014 is closed and the cycle is repeated continuously with a cycle time dependent upon the size of cavities 1046 and the type of material being molded. During this repetitious injection cycle, heat is continuously transferred by integral nozzle seal and tip 1042 according to a predetermined thermodynamic cycle. The proximity of the cooled metal around cavity 1046 and the uniform thin insulation provided between it and integral nozzle seal and tip 1042 allows for controlled solidification of the sprue. During injection, the highly conductive tip 1076 of integral nozzle seal and tip 1042 helps to conduct excess heat which is generated by the friction of the melt flowing through the constricted area of gate 1044 rearwardly to avoid stringing and drooling of the melt when the mold opens for ejection. After the melt has stopped flowing, solidification of melt in gate 1044 is enhanced by the removal of excess friction heat through tip 1076 of integral nozzle seal and tip 1042.

Also, in use, integral nozzle seal and tip 1042 is periodically removed for maintenance, repair or resin color change. To do so, nozzle 1012 is withdrawn from well 1062 and hex-nut portion 1102 of integral nozzle seal and tip 1042 is engaged by a suitable tool permit integral nozzle seal and tip 1042 to be threadingly removed from end 1052 of nozzle 1012. Since the nozzle seal of the present invention is integral, the nozzle seal is always removed in one piece from end 1052 of nozzle 1012. Unlike the prior art, due to its integral nature integral nozzle seal and tip 1042 is not susceptible to having tip 1076 remain stuck within nozzle 1012 after sleeve 1078 is removed. The thread-advancing action in unscrewing integral seal and tip 1042 from nozzle 1012 ensures that the integral seal and tip does not stick thereto.

As is known in the art, employing a highly conductive tip 1076 with a sleeve 1078 of lesser conductivity provides the combination of good conductivity along tip 1076, to maintain a rapid thermodynamic cycle, and provides thermal separation via sleeve 1078 to reduce heat lost to cooled mold 1014. (A measure of insulation is also provided by a circumferential air space 1120 provided between tip 1076 and sleeve 1078, which also partially fills with melt which solidifies to provide additional insulation.)

According to the present invention, however, bonding tip 1076 to sleeve 1078 provides an nozzle seal integral unit which results in better performance and longevity, by reason of facilitating maintenance and tip change because removal of the threaded connector portion also intrinsically removes the tip portion as well from the nozzle seat, thereby removing the possibility that the tip will be independently stuck in the nozzle and thereby require additional effort to remove. In doing so, the present invention provides a tip which will not need to be subject to the physical abuse, as it were, the prior art nozzle tips are subject to in removal from a stuck condition in a nozzle. This permits the present invention to provide a nozzle seal unit with increased longevity and which facilitates easier nozzle seal removal overall.

Advantageously, the present invention also permits integral nozzle seal and tip 1042 to be fabricated more simply because brazing tip 1076 to sleeve 1078 permits these components to be made within less strict tolerances than the prior art. Specifically, because an additional brazing material is added between tip 1076 and sleeve 1078 at interface 1100, outer surface 1080 and inner surface 1096 do not necessarily have to be within the same strictness of tolerances as with the prior art, which typically requires a smooth, face-to-face contact at interface 1100. Thus, the present invention provides a replaceable nozzle tip and seal which may be made more economically.

Figure 26:
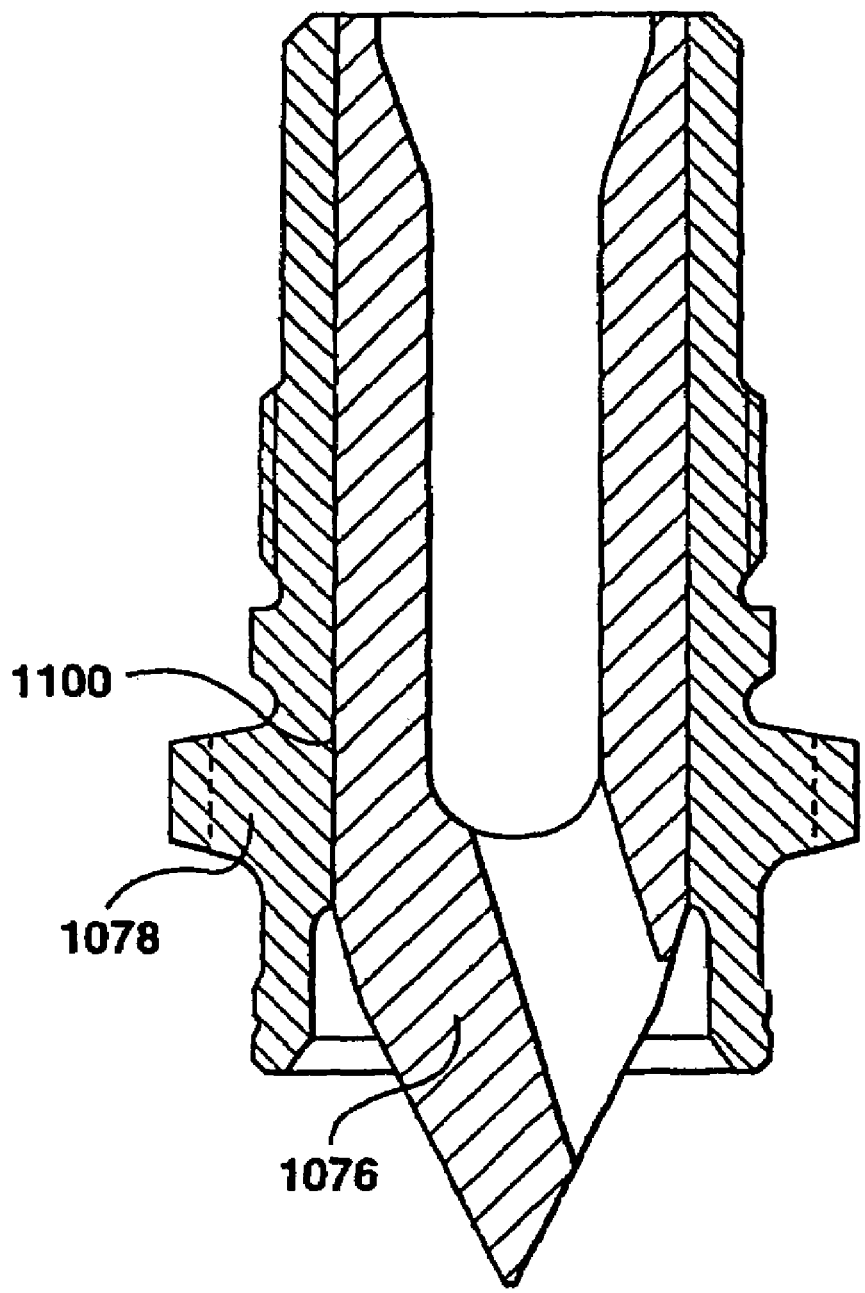
FIG. 26 is an enlarged sectional view of an alternate embodiment of the nozzle tip of FIG. 24, having no internal shoulder.

Referring to FIGS. 26–32, alternate embodiments of the nozzle tip of FIG. 24, are shown. As most of the elements are the same as those described above, common elements are described and illustrated using the same reference numerals. Referring to FIG. 26, in a first alternate embodiment, tip 1076 and sleeve 1078 are of roughly the same length and tip 1076 resides completely within sleeve 1078.

Figure 27:
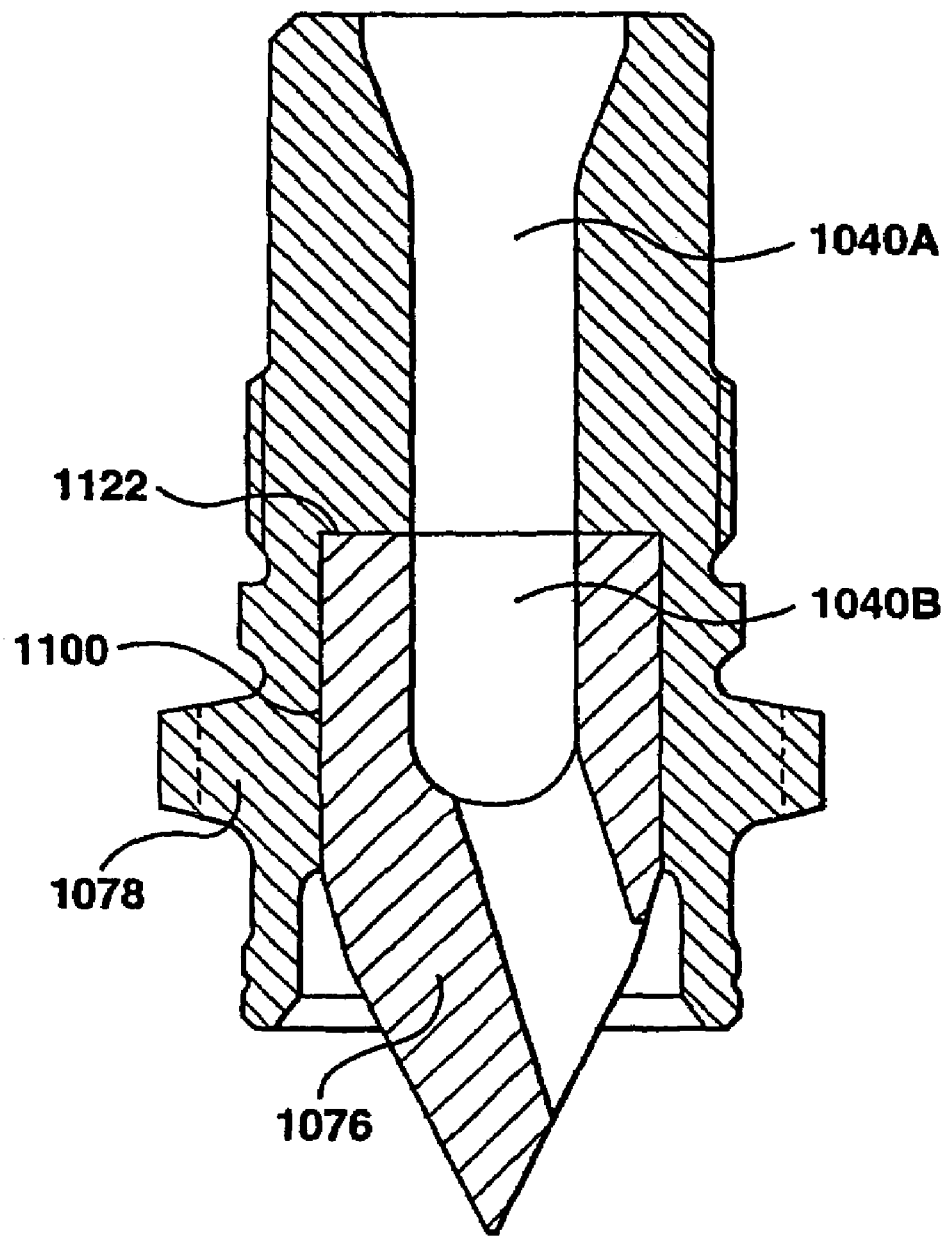
FIG. 27 is an enlarged sectional view of a further alternate embodiment of the nozzle tip of FIG. 24, having a tip of reduced size.

Referring to FIG. 27, in an alternate embodiment of the nozzle tip of FIG. 24, tip 1076 is shorter than sleeve 1078, and terminates at a shoulder 1122. Melt duct 1040 has two regions, namely a connector melt duct 1040A and a tip melt duct 1040B.

Figure 28:
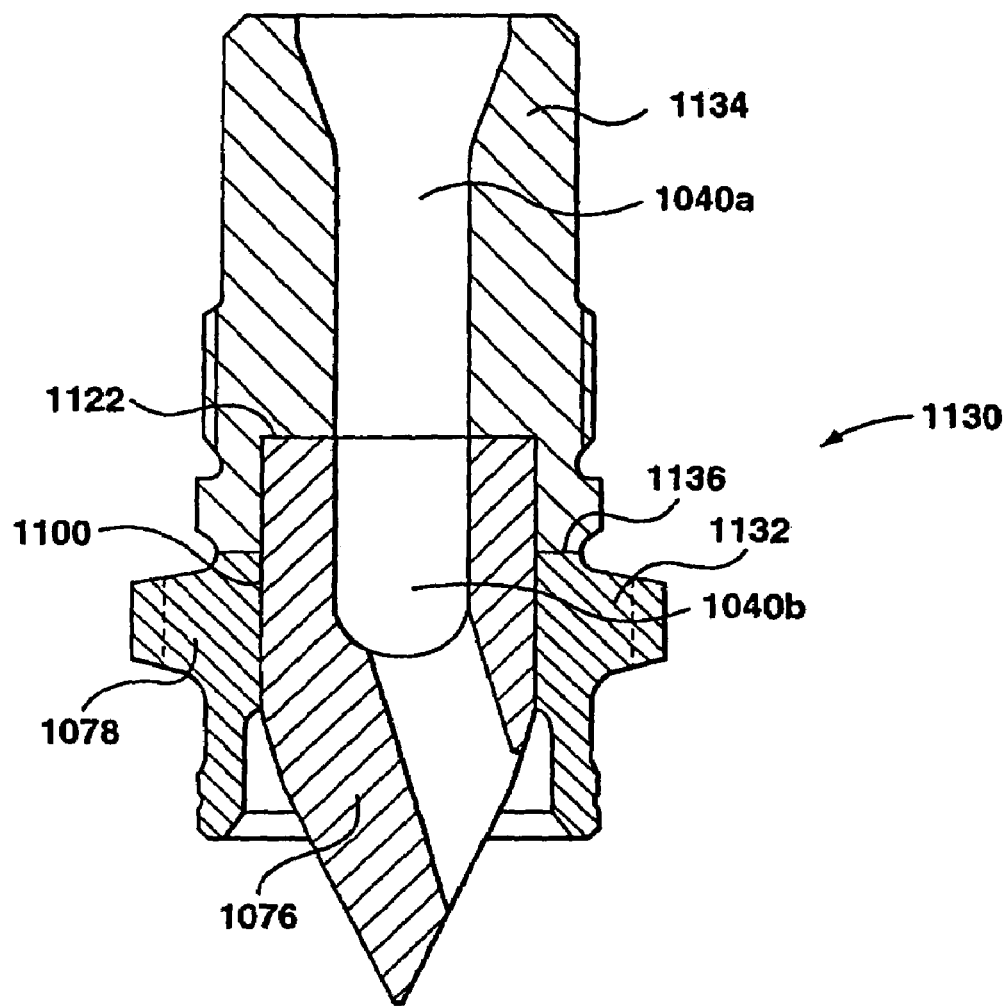
FIG. 28 is an enlarged sectional view of a yet further alternate embodiment of the nozzle tip of FIG. 24, having a two-piece seal portion.

Referring to FIG. 28, in a further alternate embodiment of the nozzle tip of FIG. 24, sleeve assembly 1130 comprises a seal member 1132 and a connector member 1134 integrally joined, preferably by brazing, along an interface 1136. Seal member 1132 is preferably made of a material having lower thermal conductivity, such as H13 stainless steel, high speed steel or titanium, while connector member 1134 is more thermally conductive and made of BeCu or other alloys of copper.

Figure 29:
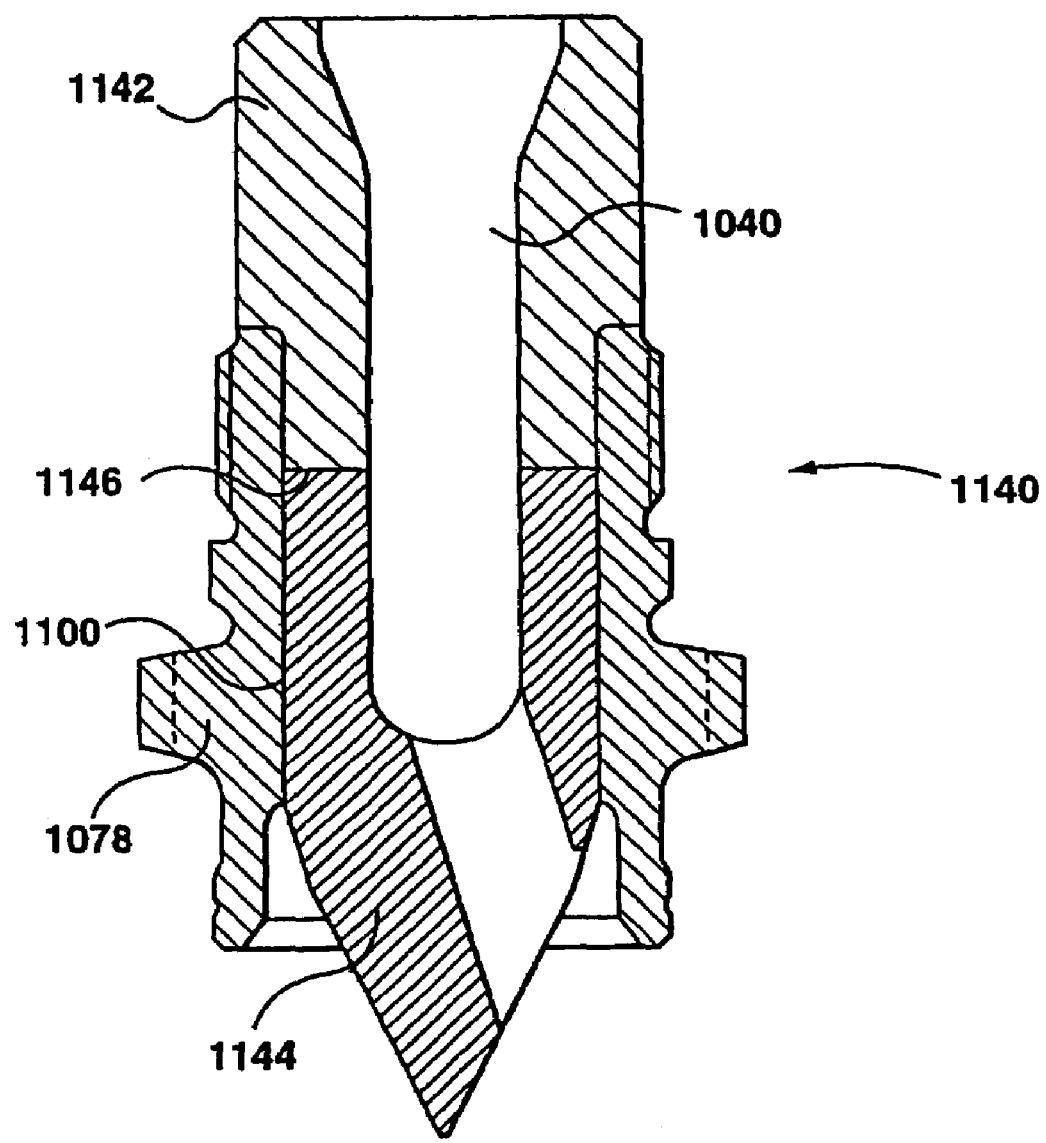
FIG. 29 is an enlarged sectional view of a still further alternate embodiment of the nozzle tip of FIG. 24, having a two-piece tip portion.

Referring to FIG. 29, in a further alternate embodiment of the nozzle tip of FIG. 24, tip assembly 1140 comprises a rear member 1142 and a tip member 1144 integrally joined, preferably by brazing, along an interface 1146.

Figure 30A:
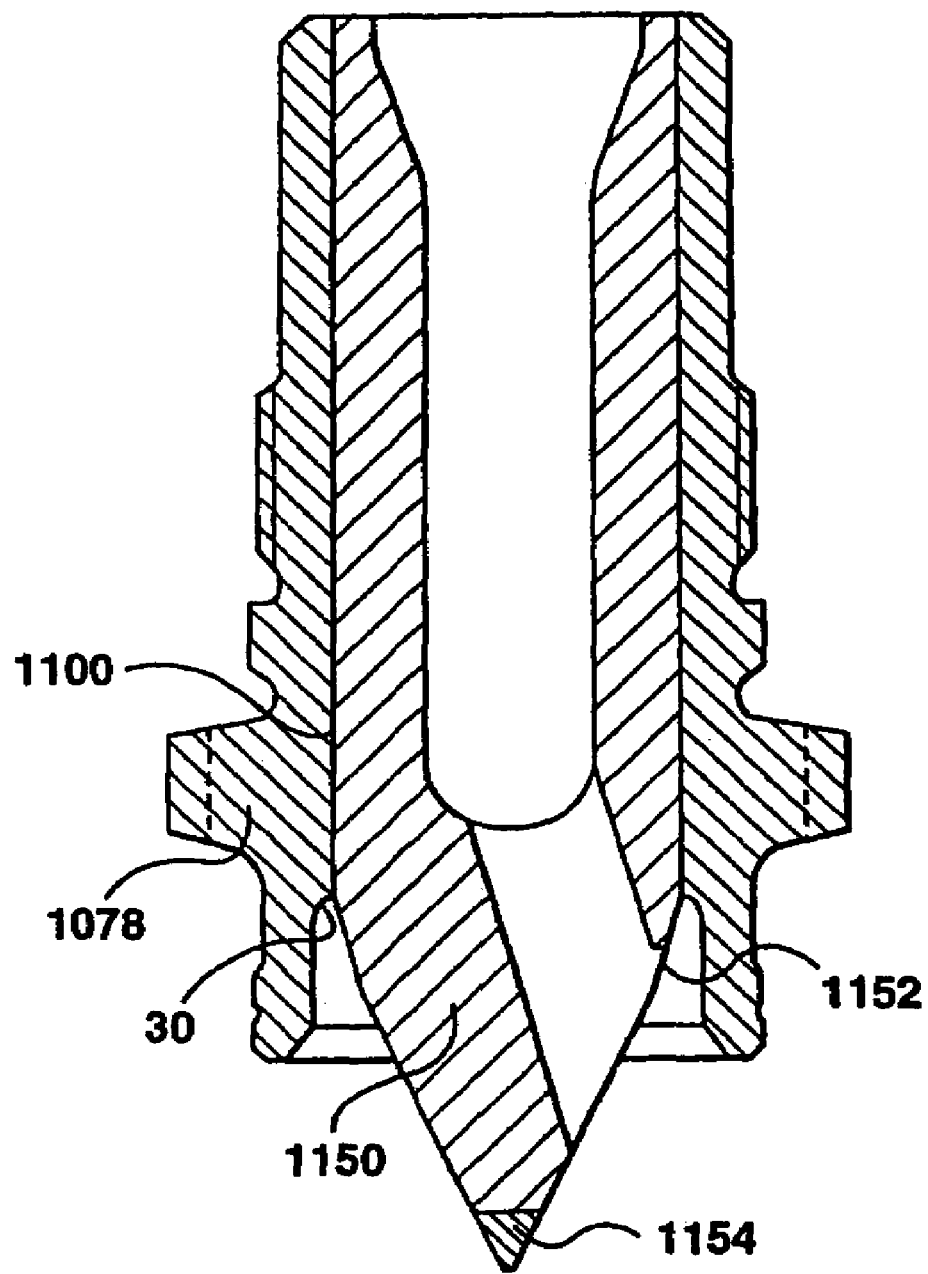
FIG. 30a is an enlarged sectional view of another alternate embodiment of the nozzle tip of FIG. 24, having a wear-resistant tip.
Figure 30B:
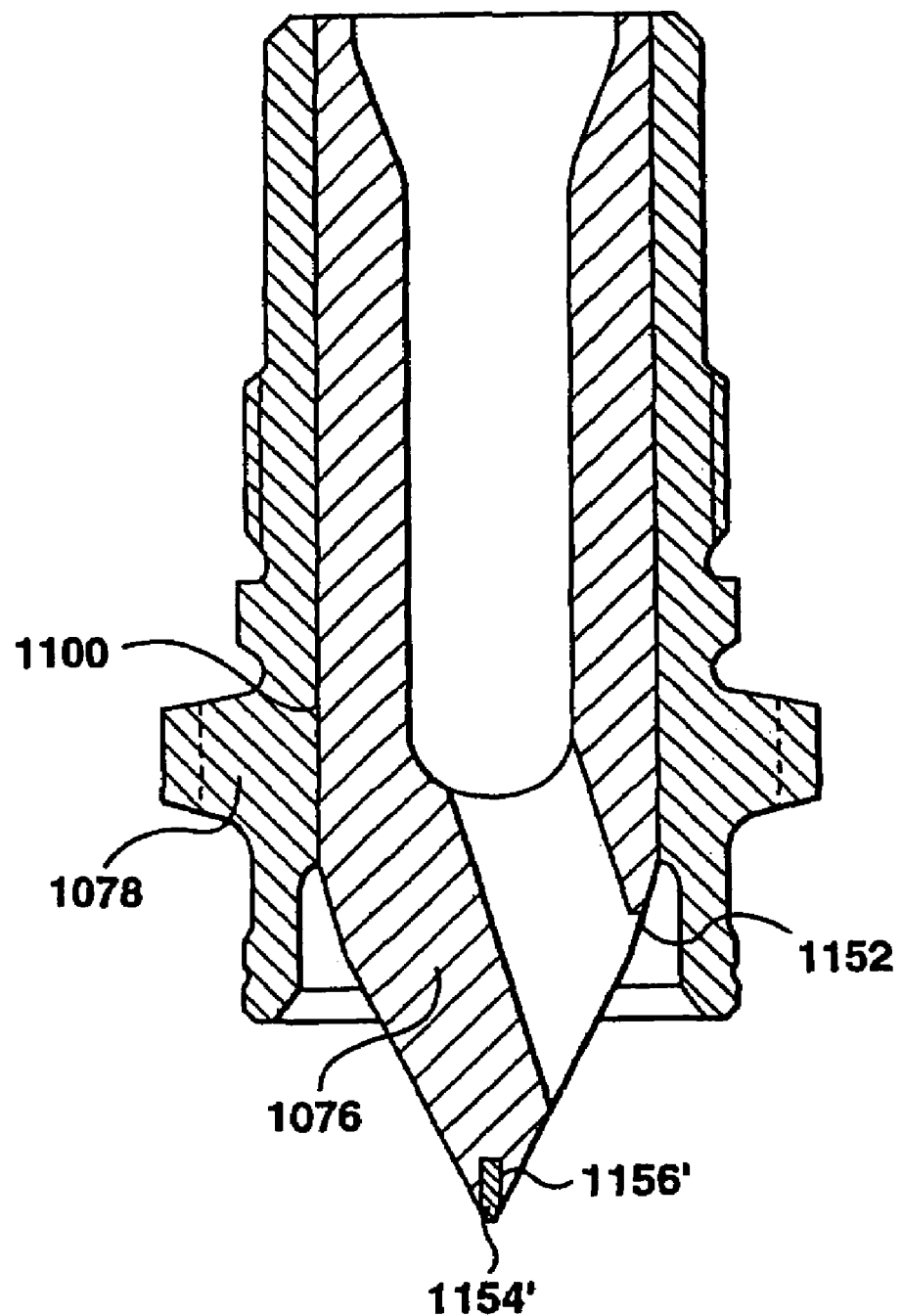

Referring to FIG. 30*a*, in a further alternate embodiment of the nozzle tip of FIG. 24, tip portion 1150 comprises a body member 1152 and a tip point 1154 integrally joined, preferably by brazing, along an interface 1156. Body member 1152 is preferably made of a material having high thermal conductivity, such as beryllium copper, and tip point 1154 is made of a corrosion and wear resistant material such as tungsten carbide. Referring to FIG. 30*b*, in an alternate configuration, a tip insert 1154' is used, which is integrally joined, preferably by brazing, along an interface 1156'. The brazing is preferably achieved with a brazing material having a substantially lower melt temperature than the brazing done at interface 1100, such that tip insert 1154' is removable without compromising the braze at interface 1100.

Figures 31A, 31B:
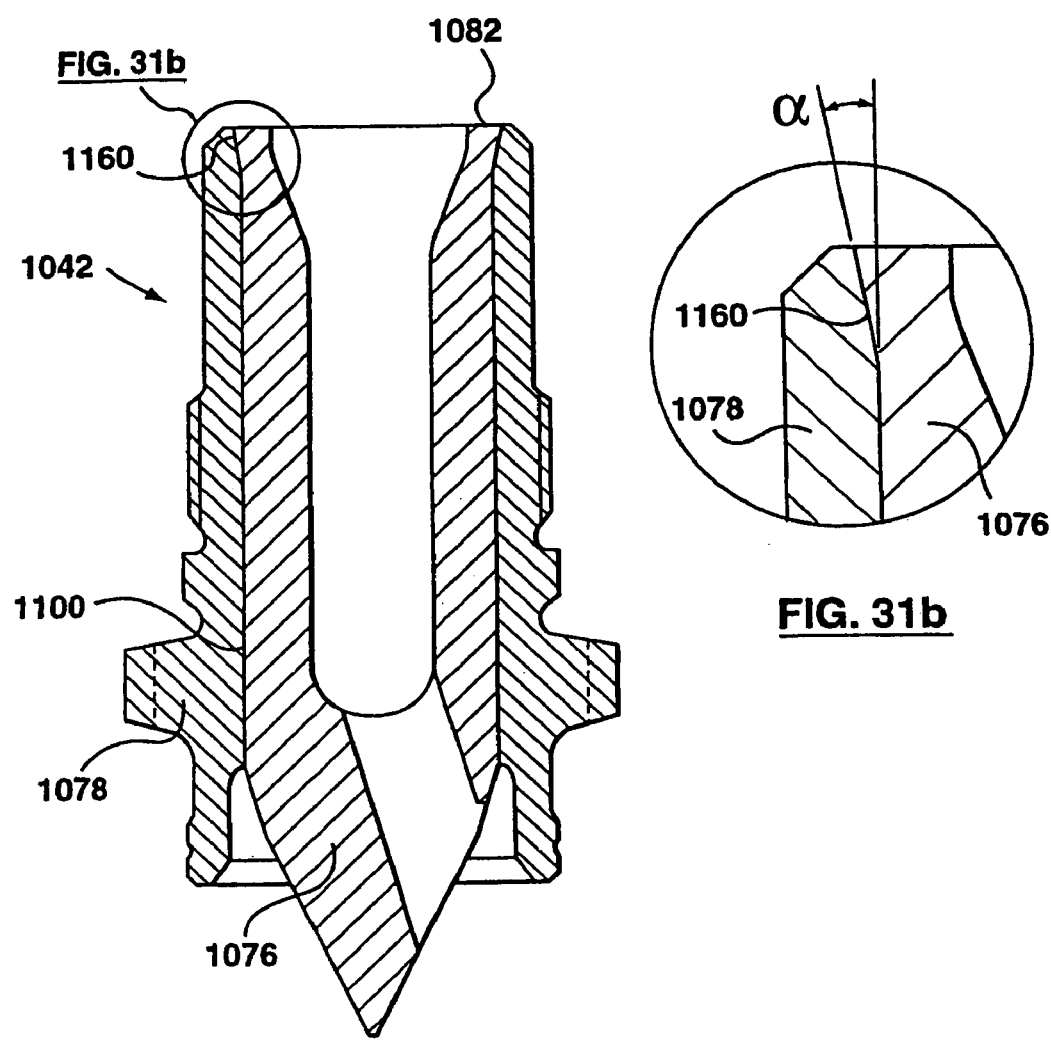
Figures 31C, 31D:
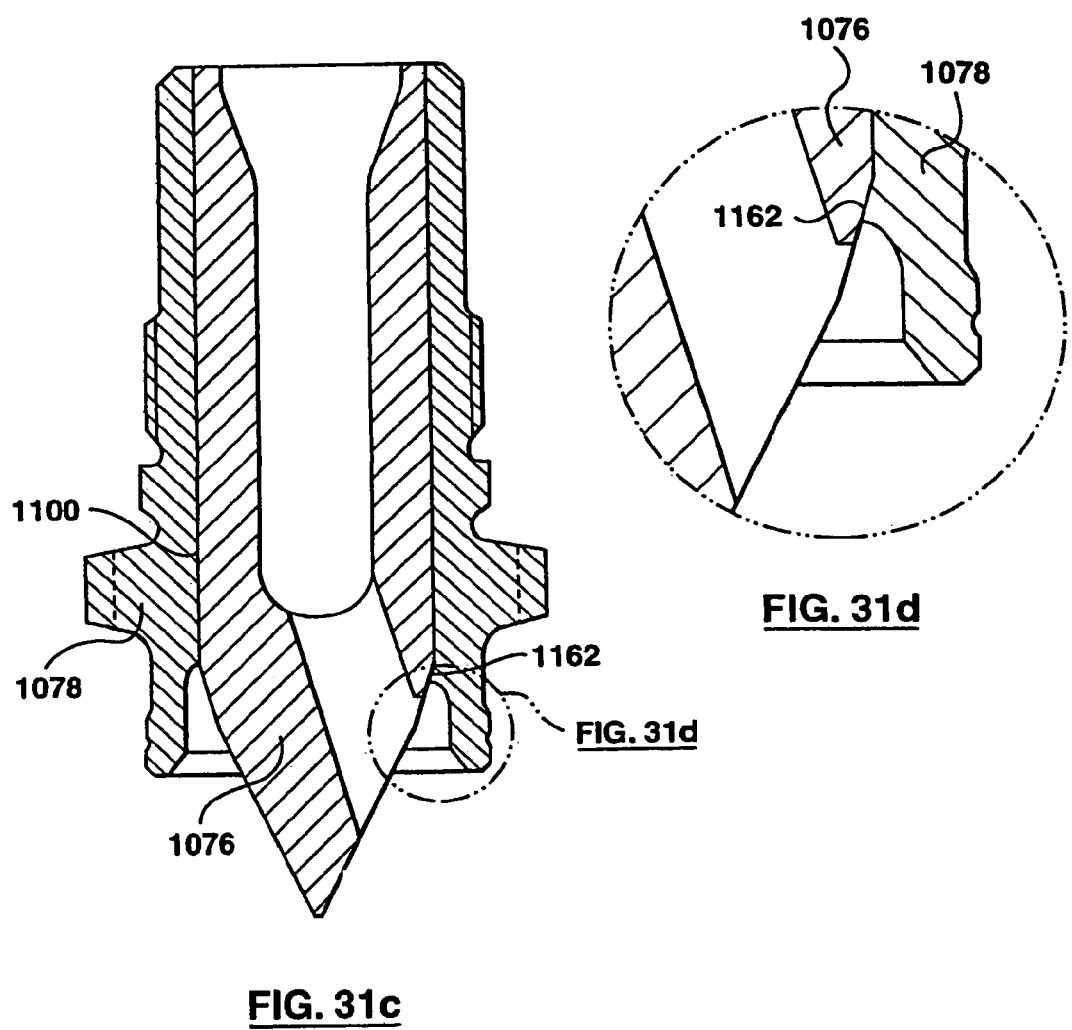
FIG. 31c is an enlarged sectional view of a second configuration of the embodiment of FIG. 31a, having an internal angled portion at a lower end thereof.
FIG. 31d is a much enlarged sectional view of a portion of FIG. 31c.

Referring to FIG. 31*a*, in another alternate embodiment nozzle tip of FIG. 24, tip 1076 and sleeve 1078 have a mating angled section 1160, near rear end 1082 of tip 1076, at which tip portion is slightly expanded in diameter. This construction assists in the assembly of integral nozzle seal and tip 1042 prior to the integral joining of tip 1076 and sleeve 1078. Referring to FIG. 31*c*, alternately a mating angled section 1162 may be provided near front end 1094 of sleeve 1078, at which tip 1076 is slightly reduced in diameter.

Figure 32:
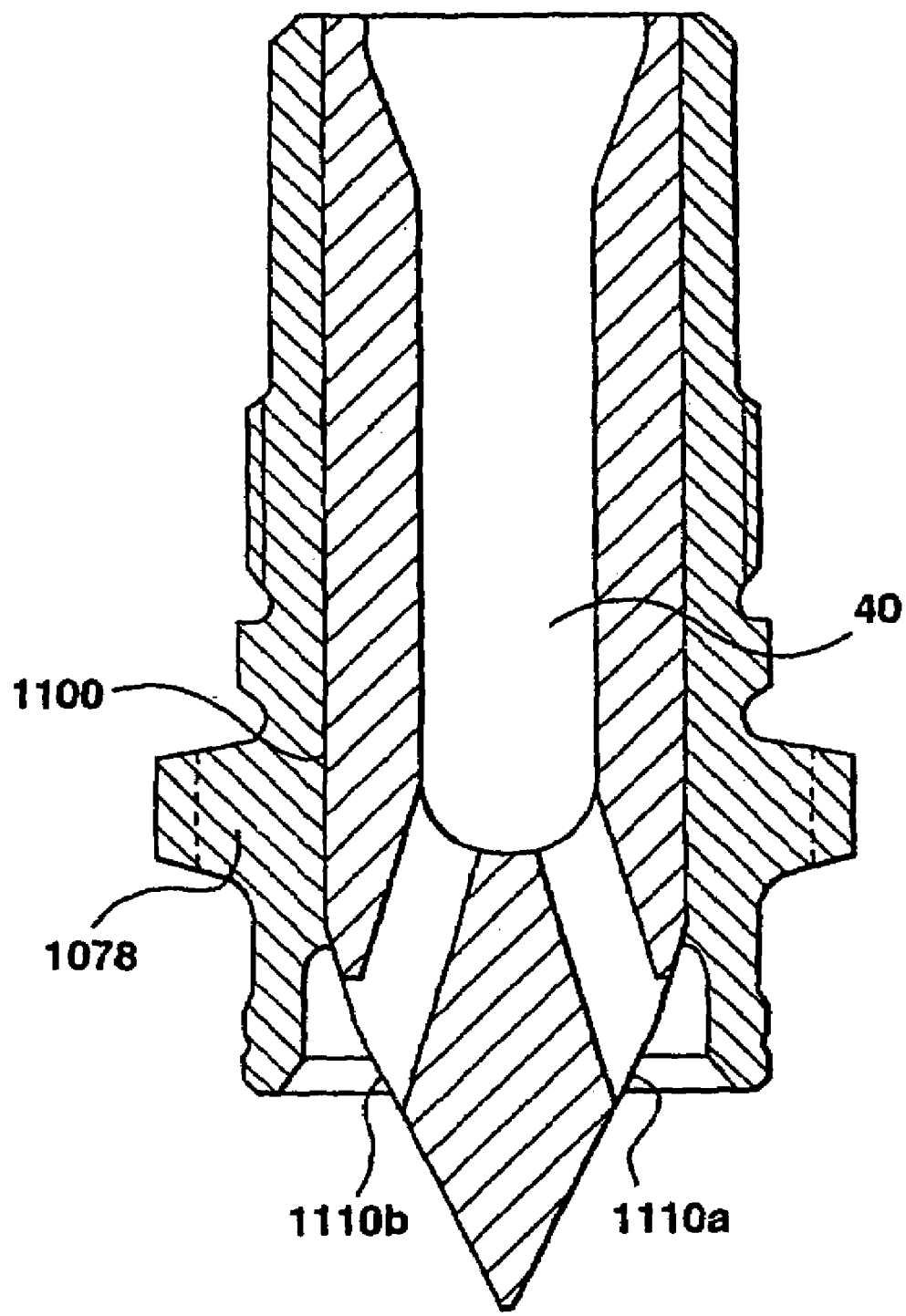
FIG. 32 is an enlarged sectional view of an alternate embodiment of the nozzle tip of FIG. 24, having a two-channel tip.

Referring to FIG. 32, in another alternate embodiment nozzle tip of FIG. 24, tip 1076 is a two-channel tip in which melt duct 1040 terminates in two outlets 1110*a* and 1110*b*.

Figure 33:
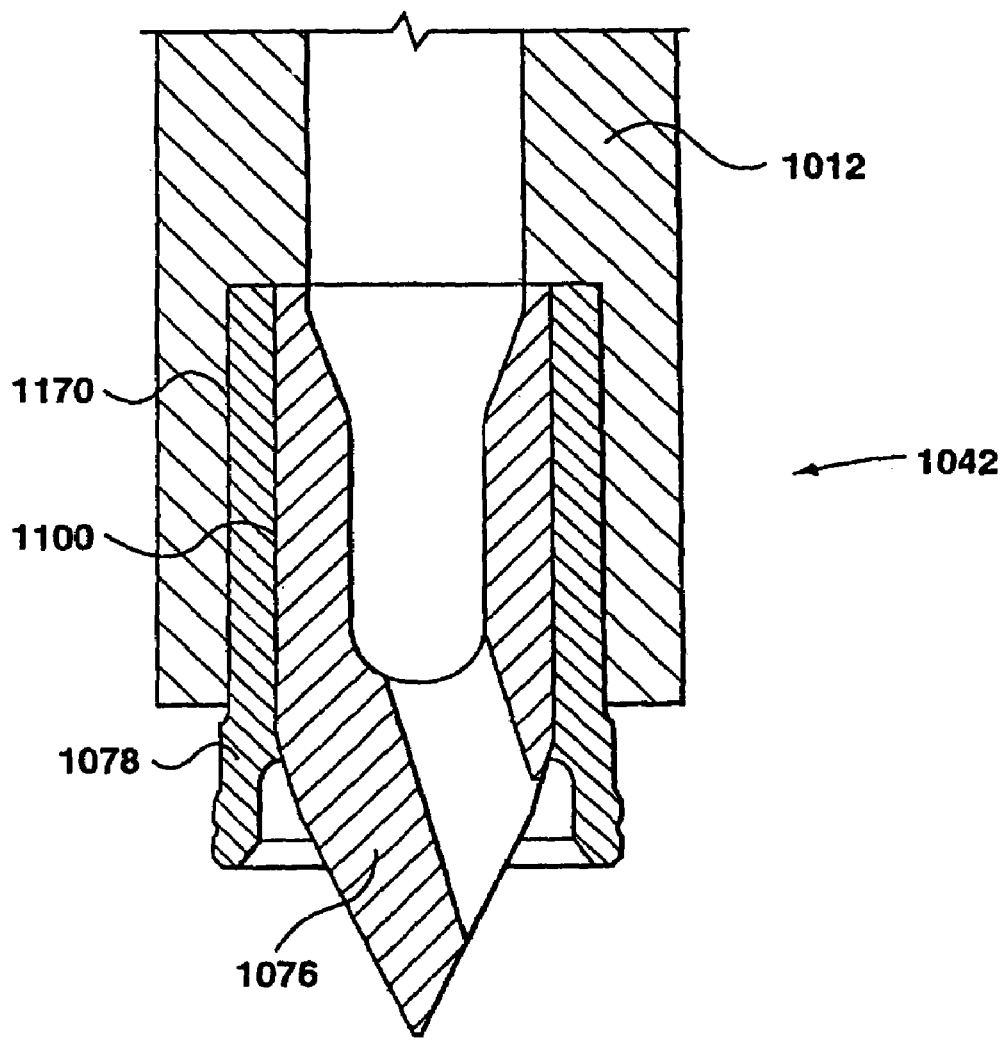
FIG. 33 is an enlarged sectional view of an alternate embodiment of the nozzle tip of FIG. 24, having alternate attachment means.
Figure 34:
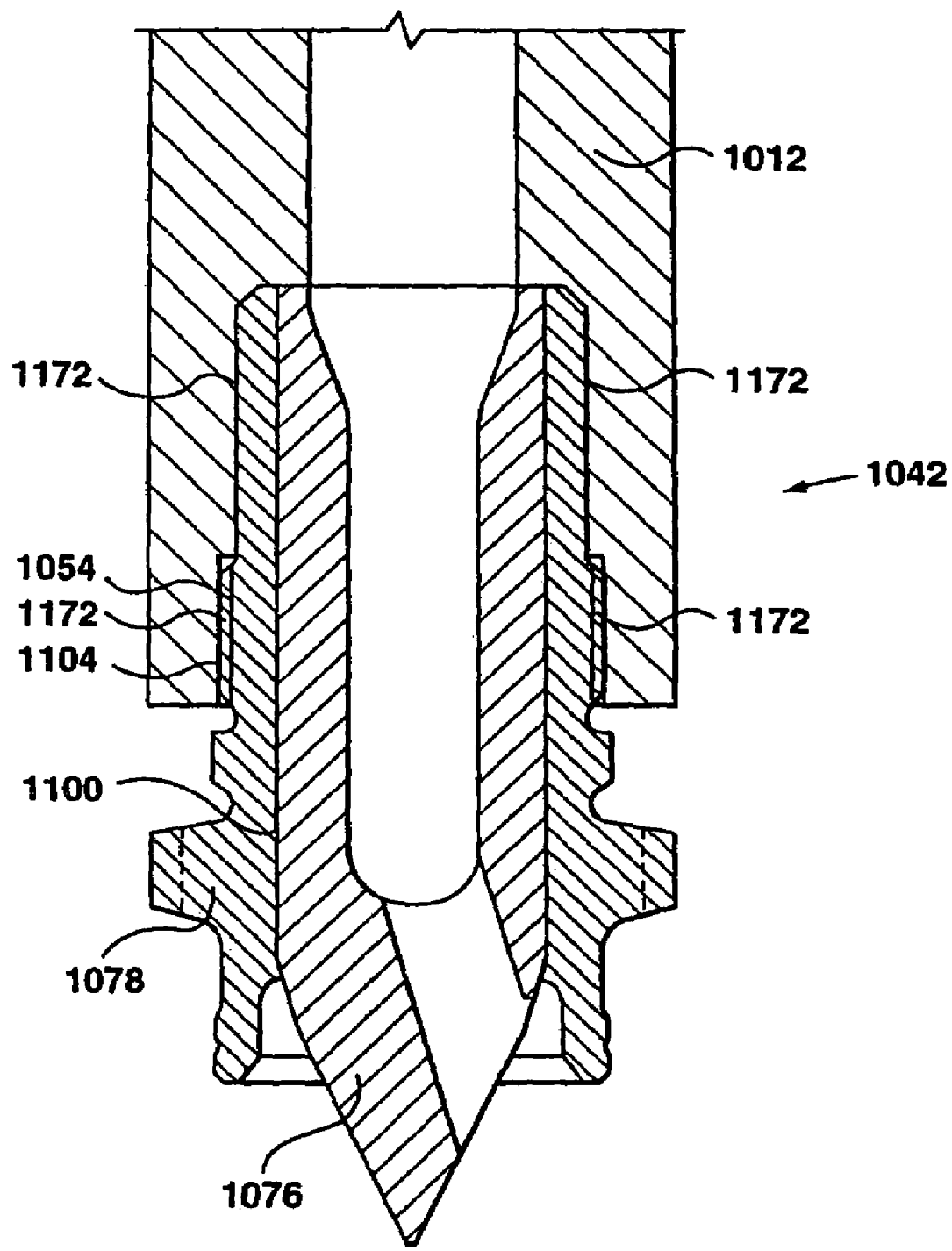
FIG. 34 is an enlarged sectional view of an alternate embodiment of the nozzle tip of FIG. 24, having a further alternate attachment means.

As one skilled in the art will appreciate, the replaceable integral nozzle seal and tip of the present invention is not limited to one in which nozzle seat 1054 and seal rear portion 1104 are threaded to one another. Rather, other means of removably connecting integral nozzle seal and tip 1042 to nozzle 1012 may be employed. For example, rear portion 1104 can be brazed to seat 1054 using a second brazing material which has a melting temperature which is substantially lower than the brazing material used at interface 1100, as disclosed in U.S. Pat. No. 6,009,616 to Gellert, incorporated herein by reference. Referring to FIG. 33, in one aspect tip 1076 is integrally brazed to sleeve 1078 along interface 1100 using a first brazing material, as described above, to make integral nozzle seal and tip 1042. The integral tip insert is then brazed to nozzle 1012, along an interface 1170, using a second brazing material which has a melting temperature preferably substantially below that of the first brazing material. This approach allows integral tip to be easily removed for replacement or repair by heating but does not affect the metallurgical bond at interface 1100 during either installation or removal. Referring to FIG. 34, in a second aspect, a combined attachment means for attaching integral nozzle seal and tip 1042 to nozzle 1012 is shown. In this aspect, integral nozzle seal and tip 1042 is both threaded and brazed to nozzle 1012. Rear portion 1104 has threads for engaging seat 1054, as described for the embodiments above, and is additionally brazed along interface 1172 using a second brazing material which has a melting temperature preferably substantially below that of the first brazing material employed at interface 1100.

Figure 35:
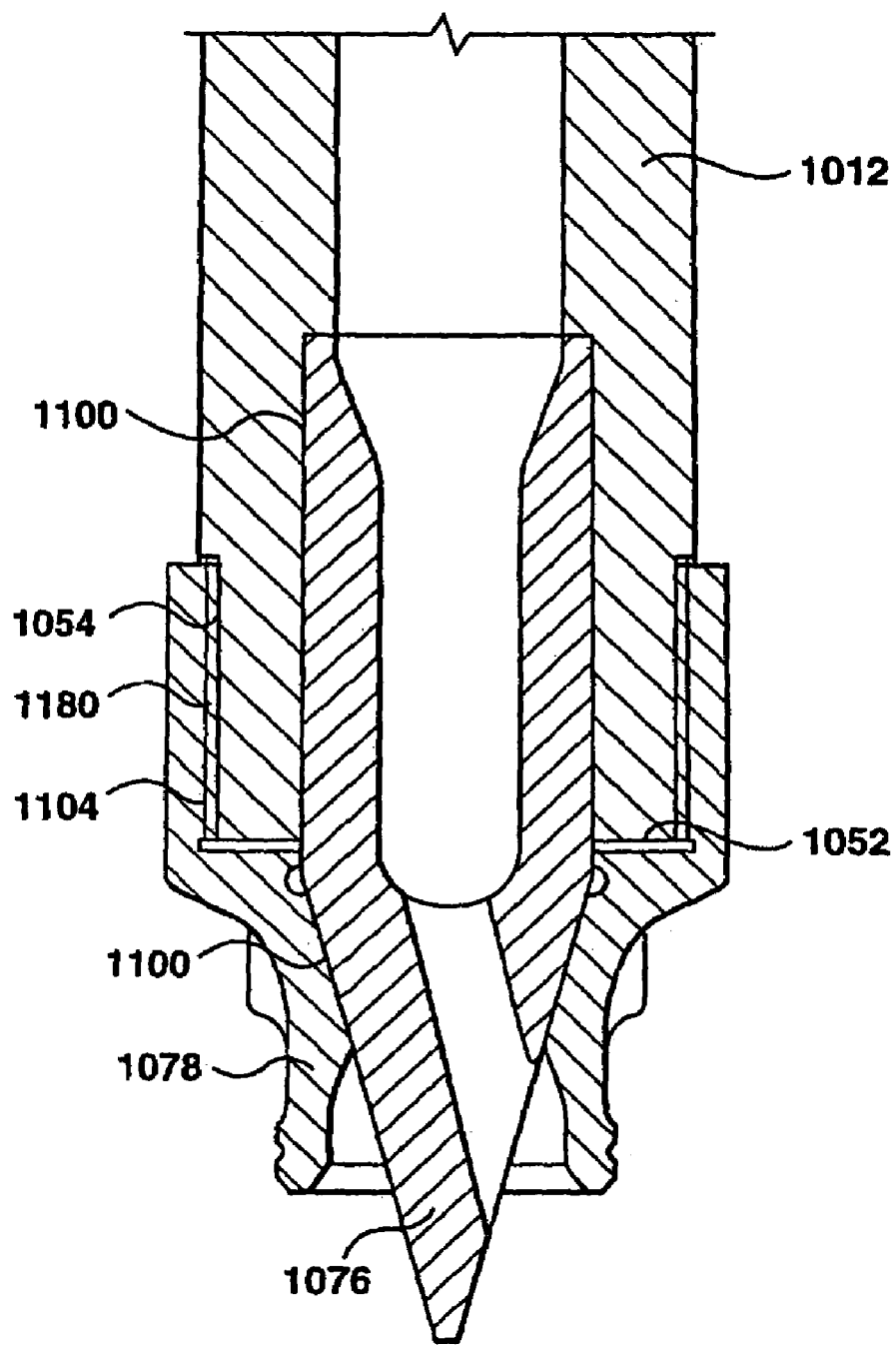
FIG. 35 is an enlarged sectional view of a portion of an injection molding system incorporating a replaceable integral nozzle tip according to a second main embodiment of the present invention.

Referring to FIG. 35, in another embodiment of the present invention sleeve 1078 is connected around and outside front end 1052 of nozzle 1012.

Sleeve 1078 has a threaded rear end 1104 which removably engages threads in seat 1054 of nozzle 1012. Tip 1076 is integrally brazed to sleeve 1078 at interface 1100. Optionally, tip 1076 may also be brazed directly to nozzle 1012, along interface 1180, using a second brazing material which has a melting temperature preferably substantially below that of the first brazing material employed at interface 1100, in a process as disclosed in Gellert U.S. Pat. No. 6,009,616 and described above. The integral connection between tip 1076 and sleeve 1078, along interface 1100 permits the integral nozzle seal and tip 1042 to be removed as a single unit.

Figure 36A:
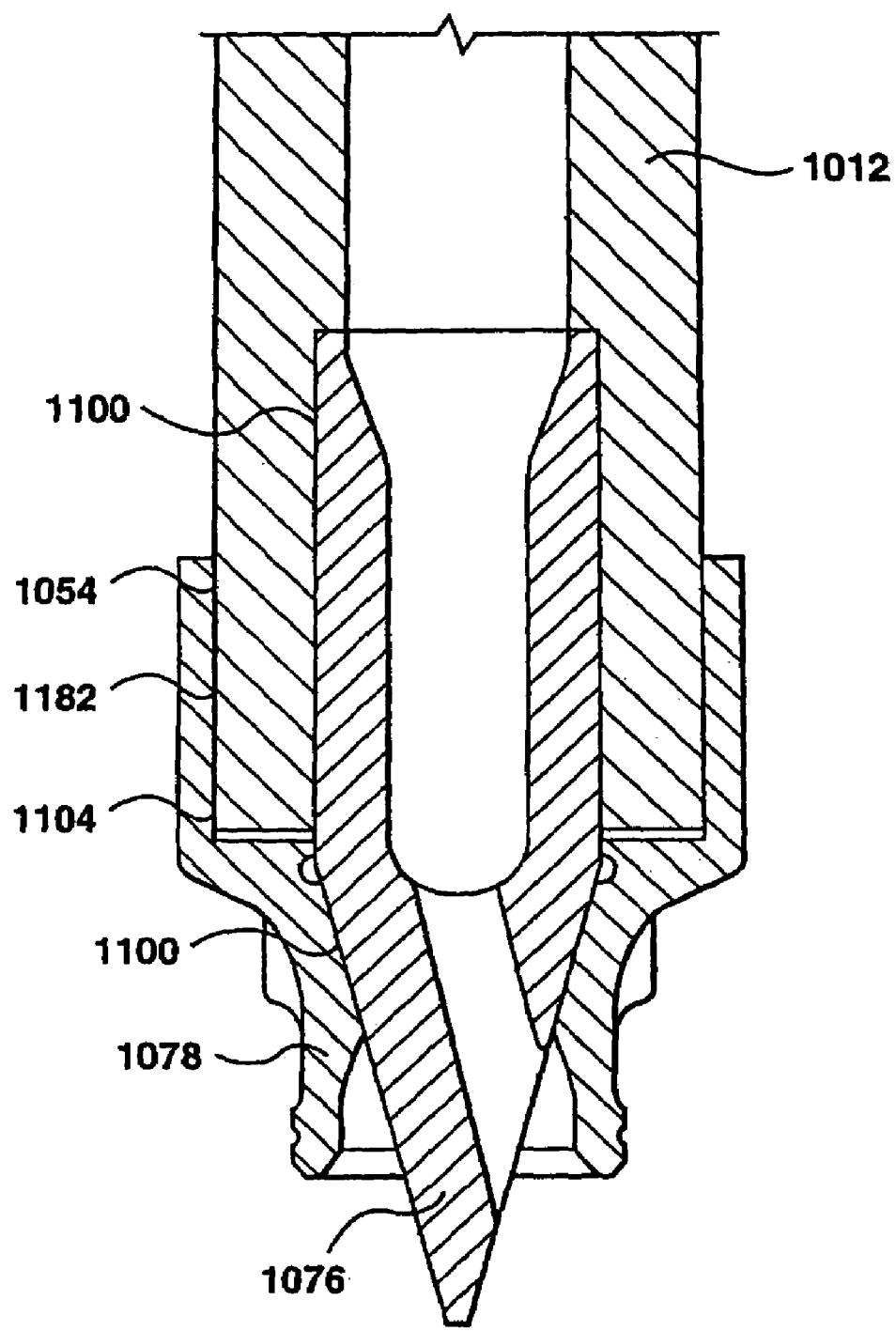
Figure 36B:
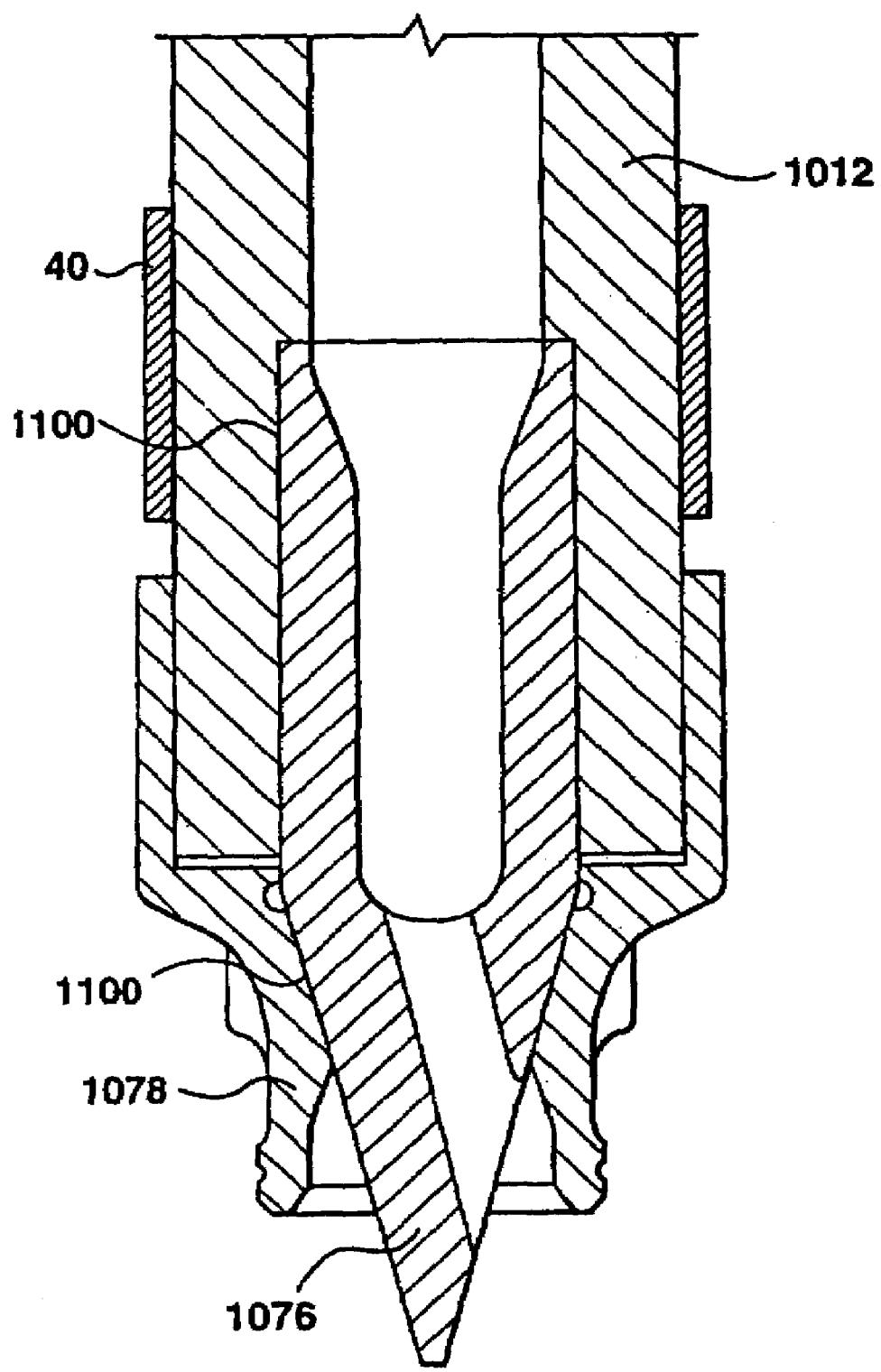
Figure 36C:
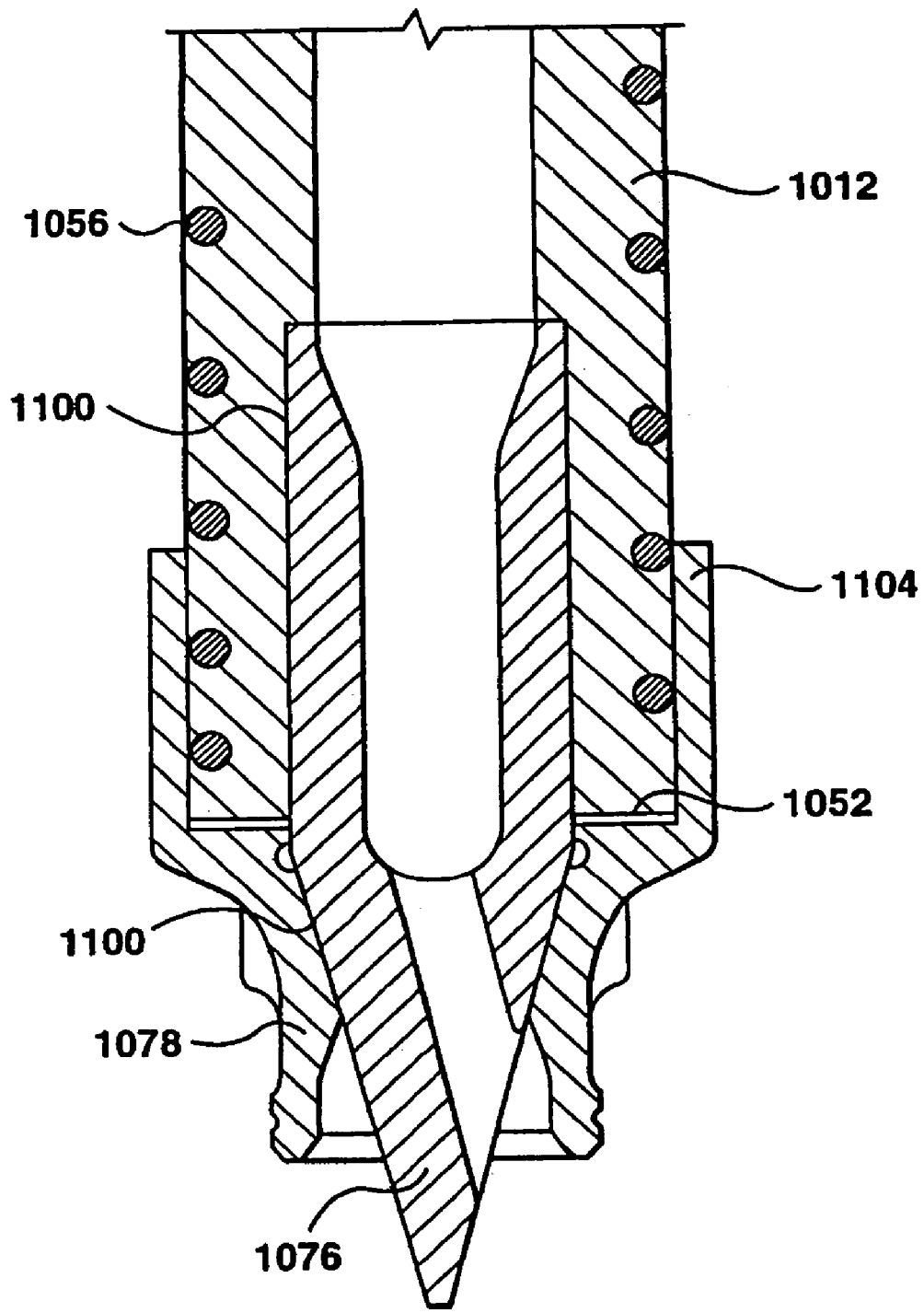
Figure 36A:
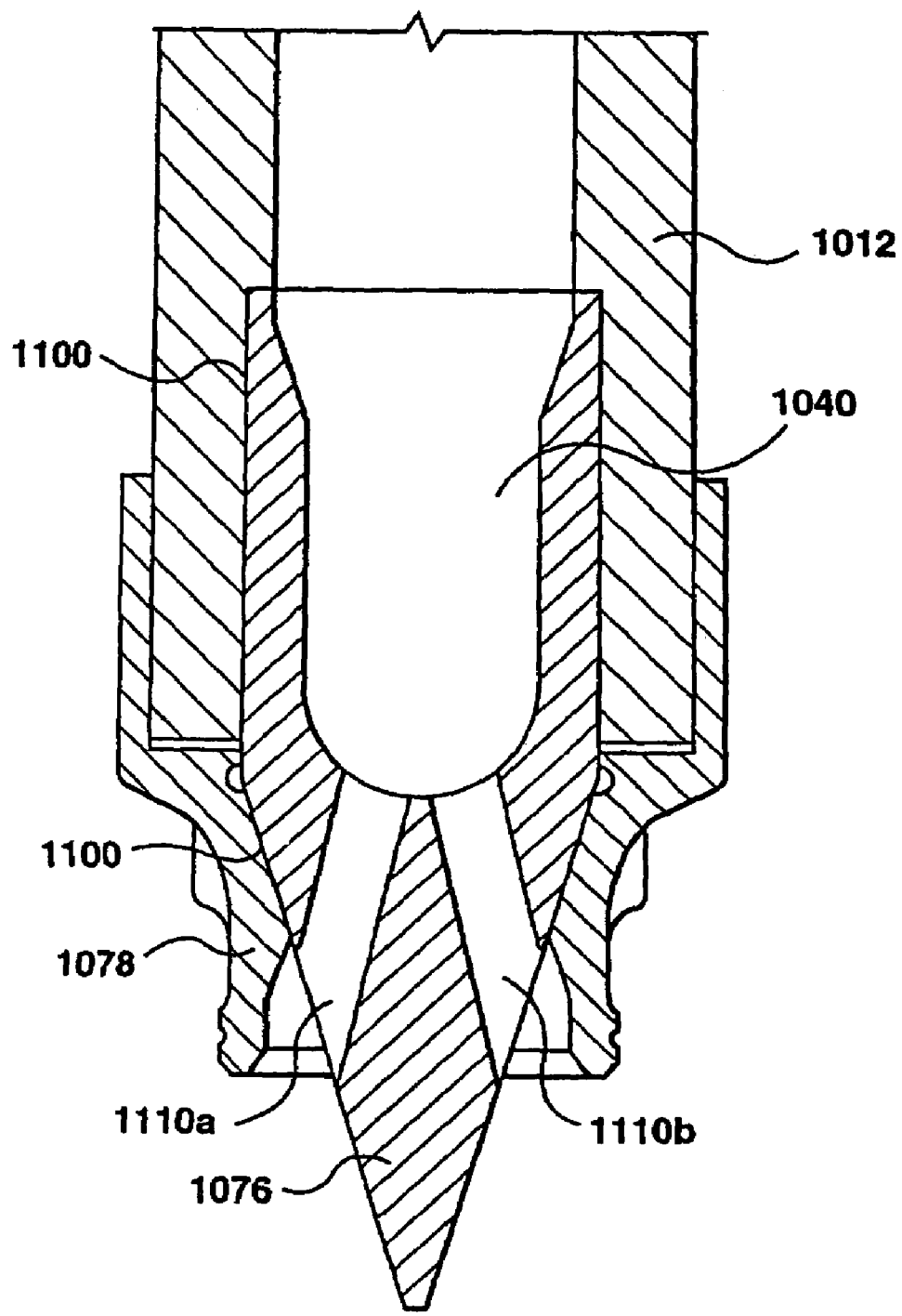

FIGS. 36*a*–36*d* disclose some of the many modifications possible to the FIG. 35 embodiment of the present invention. In FIG. 36*a*, the threaded connection between rear portion 1104 and seat 1054 is replaced by a braze along interface 1182, this braze being of a second brazing material which has a melting temperature preferably substantially below that of the first brazing material employed at interface 1100. Referring to FIG. 36*b*, nozzle 1012 may be provided with a band heater 1240, either in place of or conjunction with electrical heating element 1056 (not seen in FIG. 36*b* but shown in FIG. 24). As shown in FIG. 36*c*, electrical heating element 1056 may extend to front end 1052 of nozzle 1012 and inside the portion of nozzle 1012 surrounded by rear portion 1104 of sleeve 1078. Referring to FIG. 36*d*, tip 1076 may be a two-channel tip in which melt duct 1040 terminates in two outlets 1110*a* and 1110*b*.

As one skilled in the art will appreciate, the replaceable integral nozzle seal and tip of the present invention is not limited to a torpedo style gating as described above. Referring to FIGS. 37–40, the present invention is shown in use in several valve gating embodiments. As most of the elements are the same as those described above, common elements are described and illustrated using the same reference numerals.

Figure 37:
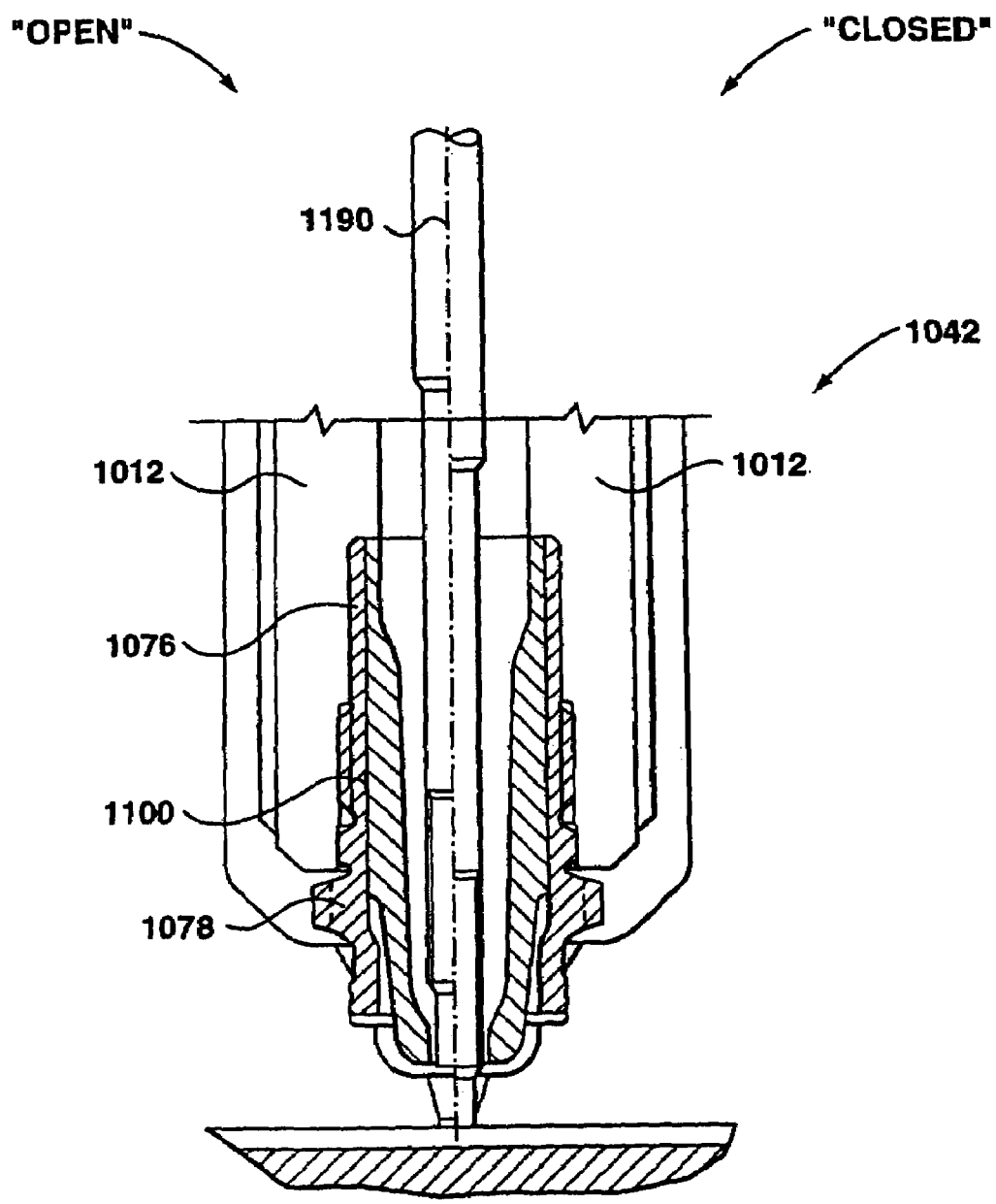
FIG. 37 is a sectional view of a portion of an injection molding system incorporating a replaceable integral valve-gated nozzle tip according to the present invention.
Figure 38:
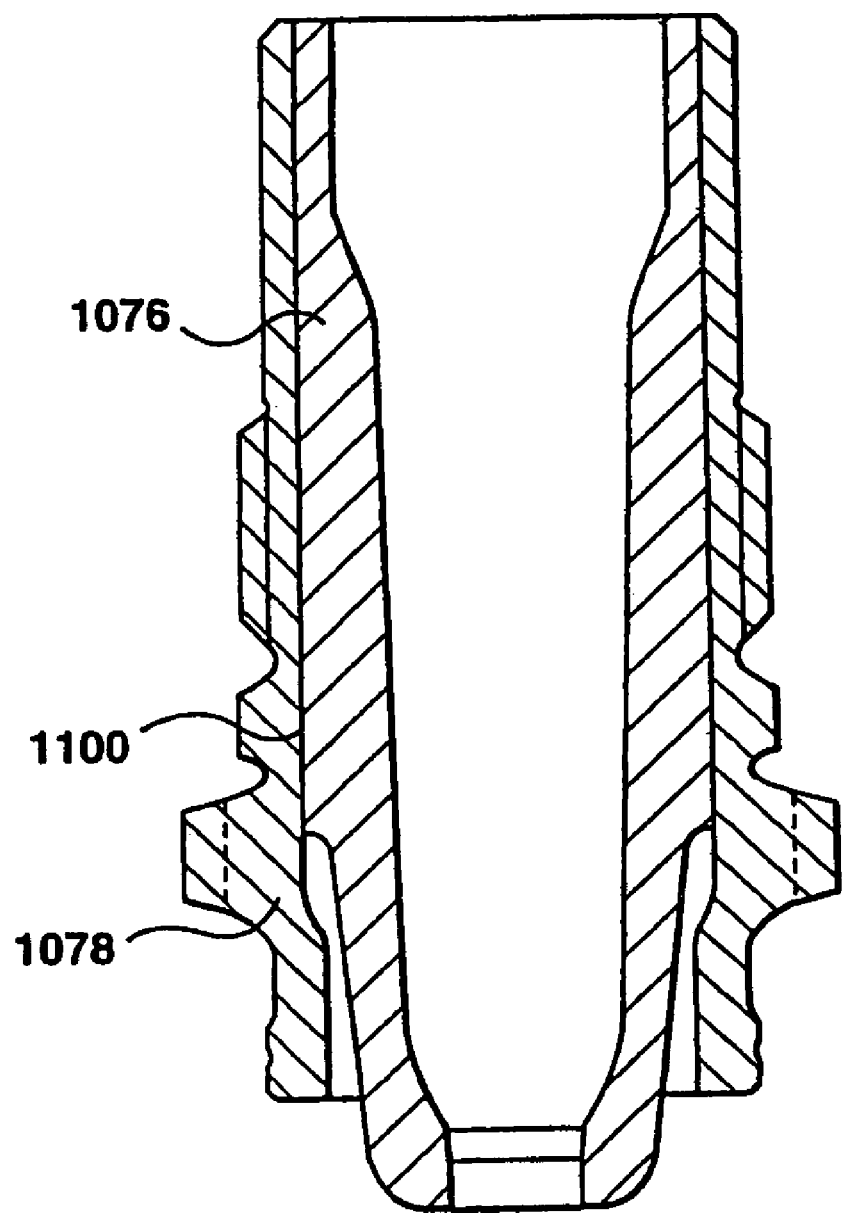
FIG. 38 is an enlarged sectional view of the nozzle tip of FIG. 37.

Referring to FIGS. 37 and 38, a portion of an injection molding nozzle is shown with a replaceable integral valvegated nozzle according to the present invention. As with the embodiments above, integral nozzle seal and tip 1042 comprises a tip 1076 and a sleeve 1076. Centrally located within melt passage 1032 and melt duct 1040 is a valve pin 1190 positionable between an "open" position (as seen on the left half of FIG. 37) and a "closed" position (as seen on the right half of FIG. 37). During the injection cycle, valve pin is withdrawn to its "open" position by suitable means (not shown) to permit pressurized melt to flow from an injection molding machine (not shown), through melt passage 1032, melt duct 1040 and gate 1044 into cavity 1046. When the cavity is tilled with melt and a suitable packing period has passed, valve pin 1190 is moved to the closed position to block and seal gate 1044 prior to the opening of the mold to eject the molded part. The specifics of the operation of such valve gates are not within the scope of the present invention and are well-known in the art and, thus, a more detailed description is not required in this specification.

Tip 1076 and a sleeve 1078 are again integrally joined, preferably by nickel alloy brazing, along an interface line 1100 between outer surface 1080 of tip 1076 and inner surface 1096 of sleeve 1078. As with the embodiments described above, tip 1076 is preferably made of a highly thermally conductive material such as beryllium copper (BeCu) while sleeve 1078 is preferably made of a material which is less thermally conductive, and preferably much less thermally conductive, than the tip 1076. Materials such as a high speed steel, H13 stainless steel and titanium are preferred.

Figure 39:
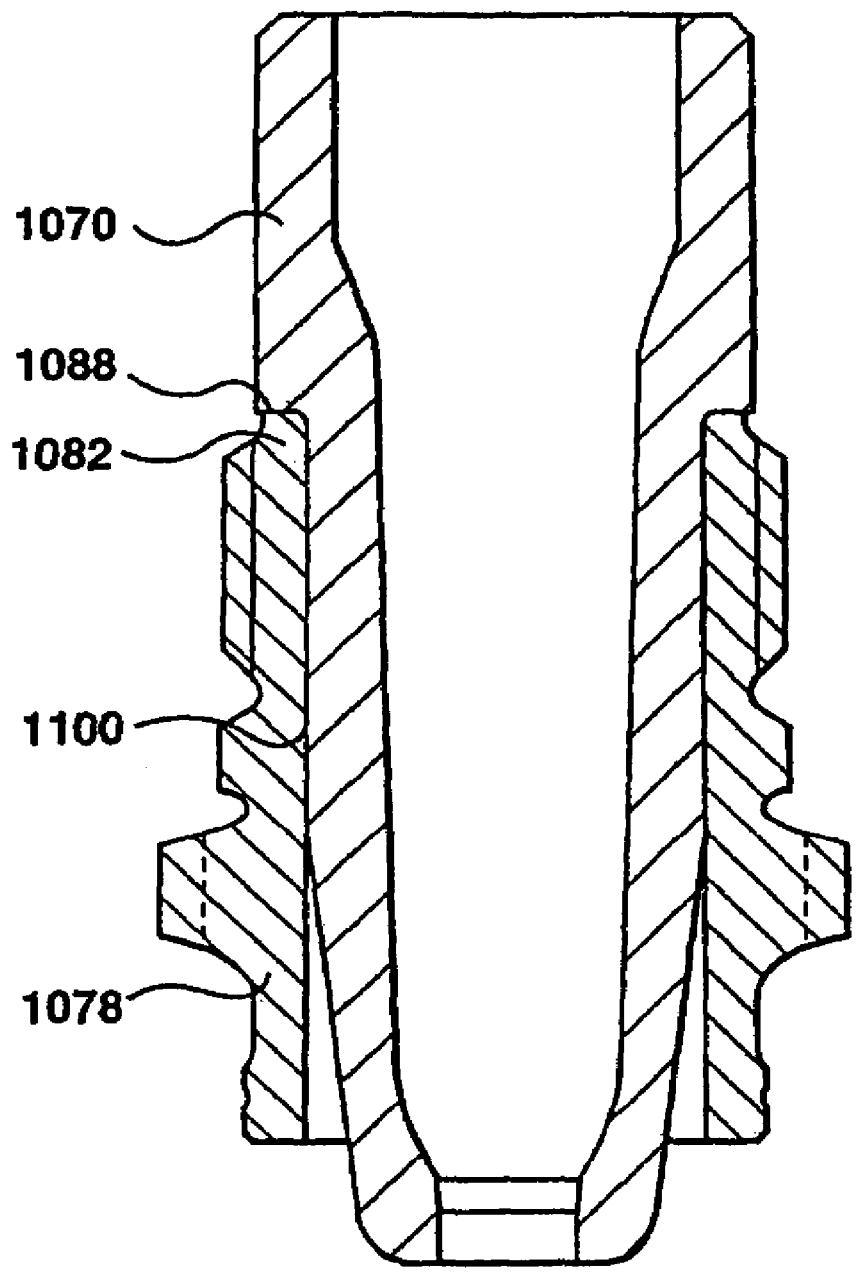
FIG. 39 is an enlarged sectional view of an alternate embodiment of the nozzle tip of FIG. 37, having an internal shoulder.
Figure 40:
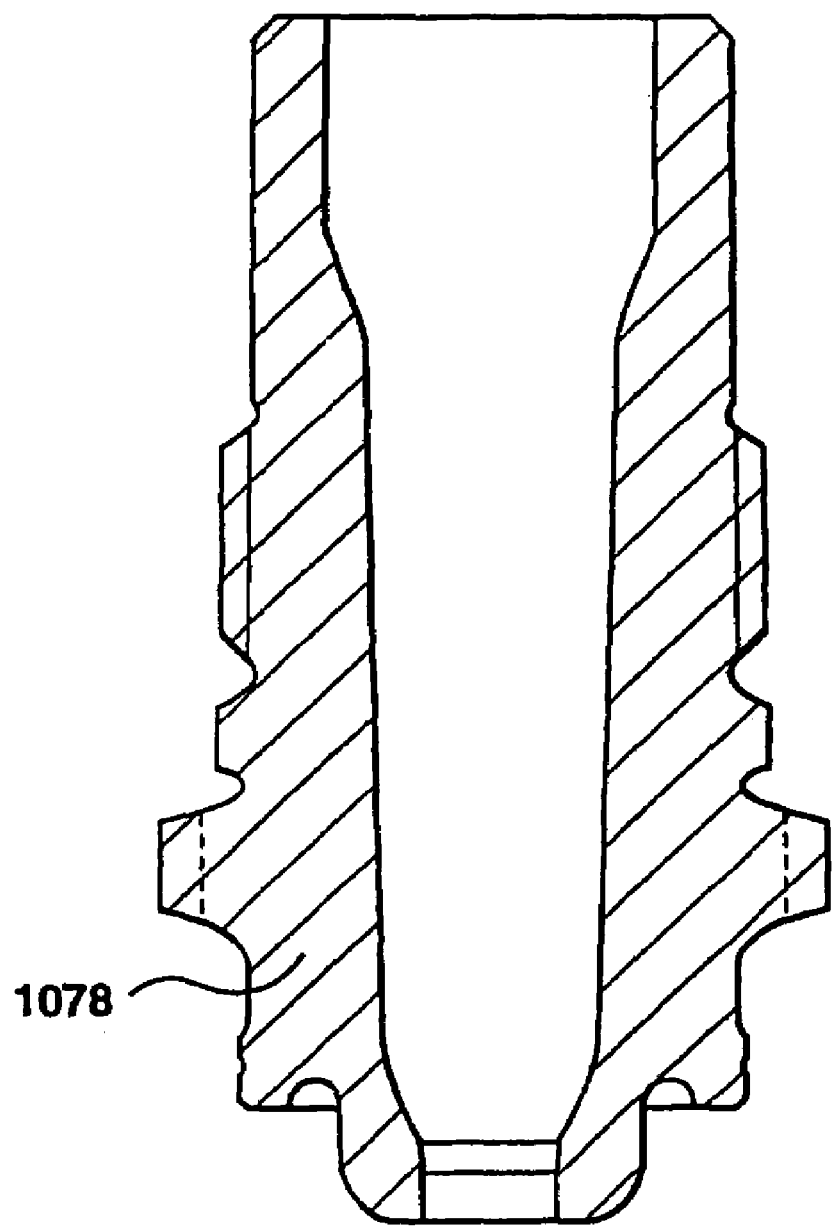
FIG. 40 is an enlarged sectional view of an alternate embodiment of the nozzle tip of FIG. 37, having an integral construction.

Referring to FIG. 39, in an alternate embodiment of the valve gate of FIGS. 33 and 34, tip 1076 has a shoulder 1088 which extends outwardly near the rear end 1082. Referring to FIG. 40, the integral nozzle seal tip 1042 is a single piece.

It will be understood that, in the descriptions in this specification, the same reference numerals have been used throughout the Figures to depict the elements which are common to, or have a common function within, the embodiments described.

While the above description constitutes the preferred embodiments, it will be appreciated that the present invention is susceptible to modification and change without departing from the fair meaning of the accompanying claims. For example, other brazing materials may be used or, rather than brazing, the nozzle tip and seal portions may be integrally made by thermally bonding, welding, thermally expanding, interference fitting tip 1076 within sleeve 1078. As well, one skilled in the art will appreciate that the present invention may also be applied to inserts utilizing other gating methods, such as sprue gates, edge gates, multi-tip gates and horizontal tip gates, and that the present invention is not limited to the gating configurations described herein. Still other modifications will be apparent to those skilled in the art and thus will be within the proper scope of the accompanying claims.

What is claimed is:

1. A nozzle in an injection molding apparatus, comprising:
   a nozzle body having a nozzle channel therethrough;
   a nozzle tip having a tip channel therethrough in communication with the nozzle channel; and
   a sleeve surrounding the tip that holds the nozzle tip with respect to the nozzle body,
   wherein one of the nozzle tip and the sleeve includes first and second pieces that are made from different materials, the first and second pieces being coupled together and coupled to the other of the nozzle tip and the sleeve;
   wherein the one of the nozzle tip and the sleeve is the sleeve, and the first and second pieces of the sleeve are brazed together.

2. The nozzle of claim 1, wherein:
   the first piece is a device used to perform the holding of the nozzle tip with respect to the nozzle body; and
   the second piece is a device used to perform sealing.

3. The nozzle of claim 1, wherein part of each of the first and second pieces of the sleeve are brazed to the nozzle tip.

4. The nozzle of claim 1, wherein the first piece of the sleeve is more thermally conductive than the second piece of the sleeve.

5. The nozzle of claim 1, wherein the first piece of the sleeve is located closer to the nozzle body than it is to the second piece of the sleeve.

6. An injection molding apparatus, comprising:
   a manifold having a manifold channel therethrough; and
   a nozzle, including:
      a nozzle channel therethrough in communication with the manifold channel;
      a nozzle tip having a tip channel therethrough in communication with the nozzle channel; and
      a sleeve surrounding the tip that holds the nozzle tip with respect to the nozzle body,
   wherein one of the nozzle tip and the sleeve includes first and second pieces that are made from different materials, the first and second pieces being coupled together and coupled to the other of the nozzle tip and the sleeve,
   wherein the one of the nozzle tip and the sleeve is the nozzle tip, and the first and second pieces of the nozzle tip are brazed together.

7. The nozzle of claim 6, wherein:
   the first piece is a thermally conductive device; and
   the second piece is a wear resistant device.

8. The nozzle of claim 6, wherein part of each of the first and second pieces of the nozzle tip are brazed to the sleeve.

9. The nozzle of claim 6, wherein the first portion of the nozzle tip is more thermally conductive than the second portion of the nozzle tip.

10. The nozzle of claim 6, wherein the first piece of the nozzle tip is located closer to the nozzle body than it is to the second piece of the nozzle tip.

11. A nozzle in an injection molding apparatus, comprising:
    a nozzle body having a nozzle channel therethrough;
    a nozzle tip having a tip channel therethrough in communication with the nozzle channel; and
    a sleeve surrounding the nozzle tip that holds the nozzle tip with respect to the nozzle body,
    wherein one of the nozzle tip and the sleeve includes first and second pieces that are made from different materials and that are coupled together, and
    wherein the one of the nozzle tip and the sleeve is the nozzle tip and the first and second pieces of the nozzle tip contact the sleeve or the one of the nozzle tip and the sleeve is the sleeve and the first and second pieces of the sleeve contact the nozzle tip.

12. A nozzle in an injection molding apparatus, comprising:
    a nozzle body having a nozzle channel therethrough;
    a nozzle tip having a tip channel therethrough in communication with the nozzle channel; and
    a sleeve surrounding the tip that holds the nozzle tip with respect to the nozzle body,
    wherein one of the nozzle tip and the sleeve includes first and second pieces that are made from different materials, the first and second pieces being coupled together and coupled to the other of the nozzle tip and the sleeve,
    wherein the one of the nozzle tip and the sleeve is the nozzle tip, and the first and second pieces of the nozzle tip are brazed together.

13. The nozzle of claim 12, wherein:
    the first piece is a thermally conductive device; and
    the second piece is a wear resistant device.

14. The nozzle of claim 12, wherein part of each of the first and second pieces of the nozzle tip are brazed to the sleeve.

15. The nozzle of claim 12, wherein the first piece of the nozzle tip is more thermally conductive than the second piece of the nozzle tip.

16. The nozzle of claim 12, wherein the first piece of the nozzle tip is located closer to the nozzle body than it is to the second piece of the nozzle tip.

17. An injection molding apparatus, comprising:
    a manifold having a manifold channel therethrough; and
    a nozzle, including:
       a nozzle channel therethrough in communication with the manifold channel;
       a nozzle tip having a tip channel therethrough in communication with the nozzle channel; and
       a sleeve surrounding the tip that holds the nozzle tip with respect to the nozzle body,
    wherein one of the nozzle tip and the sleeve includes first and second pieces that are made from different materials, the first and second pieces being coupled together and coupled to the other of the nozzle tip and the sleeve,
    wherein the one of the nozzle tip and the sleeve is the sleeve, and the first and second pieces of the sleeve are brazed together.

18. The nozzle of claim 17, wherein:
    the first piece is a device used to perform the holding of the nozzle tip with respect to the nozzle body; and
    the second piece is a device used to perform sealing.

19. The nozzle of claim 17, wherein part of each of the first and second pieces of the sleeve are brazed to the nozzle tip.

20. The nozzle of claim 17, wherein the first piece of the sleeve is more thermally conductive than the second piece of the sleeve.

21. The nozzle of claim 17, wherein the first piece of the sleeve is located closer to the nozzle body than it is to the second piece of the sleeve.

22. A nozzle in an injection molding apparatus, comprising:
   a nozzle body having a nozzle channel therethrough;
   a nozzle tip having a tip channel therethrough in communication with the nozzle channel; and
   a sleeve surrounding the nozzle tip that holds the nozzle tip with respect to the nozzle body,
   wherein one of the nozzle tip and the sleeve includes first and second pieces that are made from different materials and that are brazed together, the first and second pieces also being coupled to the other one of the nozzle tip and the sleeve.

23. The nozzle of claim 22, wherein the first piece is more thermally conductive than the second piece.

24. The nozzle of claim 22, wherein part of each of the first and second pieces are also brazed to the other one of the nozzle tip and the sleeve.

* * * * *

UNITED STATES PATENT AND TRADEMARK OFFICE
Certificate

Patent No. 7,182,591 B2                                          Patented: February 27, 2007

On petition requesting issuance of a certificate for correction of inventorship pursuant to 35 U.S.C. 256, it has been found that the above identified patent, through error and without any deceptive intent, improperly sets forth the inventorship.
   Accordingly, it is hereby certified that the correct inventorship of this patent is: George Olaru, North York (CA); and Hans Guenther, Georgetown (CA).

Signed and Sealed this First Day of December 2009.

YOGENDRA GUPTA
*Supervisory Patent Examiner*
Art Unit 1791